US012802624B2

(12) United States Patent
Okamoto et al.

(10) Patent No.: US 12,802,624 B2
(45) Date of Patent: Nov. 17, 2026

(54) DISPLAY CONTROL DEVICE AND DISPLAY DEVICE

(71) Applicant: Sony Group Corporation, Tokyo (JP)

(72) Inventors: Eizo Okamoto, Kanagawa (JP); Shoji Yamane, Aichi (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 19/101,488

(22) PCT Filed: Aug. 21, 2023

(86) PCT No.: PCT/JP2023/029938
§ 371 (c)(1),
(2) Date: Feb. 5, 2025

(87) PCT Pub. No.: WO2024/053373
PCT Pub. Date: Mar. 14, 2024

(65) Prior Publication Data
US 2026/0038423 A1 Feb. 5, 2026

(30) Foreign Application Priority Data
Sep. 9, 2022 (JP) ................................ 2022-143836

(51) Int. Cl.
*G09G 3/32* (2016.01)

(52) U.S. Cl.
CPC ......... *G09G 3/32* (2013.01); *G09G 2300/026* (2013.01); *G09G 2320/041* (2013.01);
(Continued)

(58) Field of Classification Search
CPC ........................................................ G09G 3/32
See application file for complete search history.

(56) References Cited

U.S. PATENT DOCUMENTS

| | | | | |
|---|---|---|---|---|
| 9,059,337 | B1 | 6/2015 | Robinson et al. | |
| 2011/0254876 | A1* | 10/2011 | Yokoyama ............ | G06F 3/1446 345/690 |
| 2015/0049003 | A1* | 2/2015 | Fujimaki ............ | G02B 27/0172 345/8 |

FOREIGN PATENT DOCUMENTS

| | | |
|---|---|---|
| JP | 2002196717 A | 7/2002 |
| JP | 2009216809 A | 9/2009 |

(Continued)

OTHER PUBLICATIONS

International Search Report for Application No. PCT/JP2023/029938 mailed Oct. 17, 2023, 3 pages.

*Primary Examiner* — Chun-Nan Lin
(74) *Attorney, Agent, or Firm* — Lerner David LLP

(57) ABSTRACT

In a case where an image is divided for display in respective ones of a plurality of areas, a target average value calculation unit sets the image in one of the plurality of areas as a display control target and calculates a target average value that is an average value of luminance of the display control target. A data communication unit receives a non-target average value that is an average value of luminance for each area of an image other than the display control target in the image. An overall average value calculation unit calculates an overall average value that is an average value of luminance of a whole of the image on the basis of the target average value and the non-target average value. The present technology is applicable to, for example, a display system and the like.

7 Claims, 13 Drawing Sheets

(52) U.S. Cl.
CPC ............... *G09G 2320/0626* (2013.01); *G09G 2320/066* (2013.01); *G09G 2320/0686* (2013.01); *G09G 2330/021* (2013.01); *G09G 2360/04* (2013.01); *G09G 2360/16* (2013.01)

(56) References Cited

FOREIGN PATENT DOCUMENTS

| | | | | | |
|---|---|---|---|---|---|
| JP | 2011154174 | A | | 8/2011 | |
| JP | 2011227303 | A | | 11/2011 | |
| JP | 2012247540 | A | | 12/2012 | |
| JP | 2013238793 | A | | 11/2013 | |
| KR | 20210042663 | A | * | 4/2021 | ........... G09G 3/2003 |

* cited by examiner

DISPLAY CONTROL DEVICE AND DISPLAY DEVICE

CROSS-REFERENCE TO RELATED APPLICATIONS

This application is a national phase entry under 35 U.S.C. § 371 of International Application No. PCT/JP2023/029938 filed Aug. 21, 2023, which claims the priority from Japanese Patent Application No. 2022-143836 filed in the Japanese Patent Office on Sep. 9, 2022, the entire contents of which are hereby incorporated by reference.

TECHNICAL FIELD

The present technology relates to a display control device and a display device, and particularly relates to a display control device and a display device enabled to improve contrast of a display image without increasing a total power consumption due to display in a case where an image is divided into a plurality of areas and a plurality of display control devices controls display of the image in respective areas.

BACKGROUND ART

Many home television receivers have introduced an auto brightness level (ABL) function that automatically adjusts display luminance. This function is an image quality improving function of improving the contrast of the display image without increasing the total power consumption due to display by adjusting the display luminance of the image on the basis of an average value of luminance values of an entire image to be displayed. Since the number of display sections of the home television receiver is one, the average value of luminance values of the entire image to be displayed can be calculated by an image processing integrated circuit (IC) or the like of the display section, and the ABL function can be implemented.

On the other hand, in recent years, a market has expanded for large displays including an arrangement of a plurality of display sections. In such a large display, since the number of display sections is plural and variable, only an area to be displayed in the entire image is supplied to each display section. Thus, it is difficult for each display section to calculate the average value of luminance values of the entire image to be displayed.

In such a large display, it has been devised that in a case where a plurality of modules including a display section is controlled by one video controller, each module supplies an average gradation of an image of an area to be displayed to the video controller, the video controller transmits a luminance setting signal to each module on the basis of the average gradation supplied from the module, and each module performs display on the basis of the luminance setting signal (see, for example, Patent Document 1).

CITATION LIST

Patent Document

Patent Document 1: Japanese Patent Application Laid-Open No. 2012-247540

SUMMARY OF THE INVENTION

Problems to be Solved by the Invention

However, in a case where a plurality of display sections constituting a large display is respectively controlled by display control devices such as a plurality of video controllers, a method for introducing the ABL function has not been considered.

Thus, in a case where an image is divided into a plurality of areas and a plurality of display control devices controls display of the image in respective areas, it is demanded to provide a method for improving the contrast of the display image without increasing the total power consumption due to display, similarly to a home television receiver having an ABL function, but such a demand is not sufficiently met.

The present technology has been made in view of such a situation, and the present technology makes it possible to improve contrast of a display image without increasing a total power consumption due to display in a case where an image is divided into a plurality of areas and a plurality of display control devices controls display of the image in respective areas.

Solutions to Problems

A display control device of a first aspect of the present technology is a display control device including: a target average value calculation unit that sets, in a case where an image is divided into a plurality of areas and a plurality of display control devices controls display of the image in respective areas, the image in one of the plurality of areas as a display control target and calculates a target average value that is an average value of luminance of the display control target; a reception unit that receives, from another display control device, a non-target average value that is an average value of luminance for each of the areas of an image other than the display control target in the image; an overall average value calculation unit that calculates an overall average value that is an average value of luminance of a whole of the image on the basis of the target average value calculated by the target average value calculation unit and the non-target average value received by the reception unit; and a luminance information transmission unit that transmits, to the another display control device, luminance information regarding the luminance of the whole of the image, the luminance information corresponding to the overall average value calculated by the overall average value calculation unit.

In the first aspect of the present technology, in a case where an image is divided into a plurality of areas and a plurality of display control devices controls display of the image in respective areas, the image in one of the plurality of areas is set as a display control target and a target average value is calculated that is an average value of luminance of the display control target, a non-target average value that is an average value of luminance for each of the areas of an image other than the display control target in the image is received from another display control device, an overall average value that is an average value of luminance of a whole of the image is calculated on the basis of the target average value and the non-target average value, and luminance information regarding the luminance of the whole of the image is transmitted to the another display control device, the luminance information corresponding to the overall average value.

A display control device of a second aspect of the present technology is a display control device including: a target average value calculation unit that sets, in a case where an image is divided into a plurality of areas and a plurality of display control devices controls display of the image in respective areas, the image in one of the plurality of areas as a display control target and calculates a target average value that is an average value of luminance of the display control target; a transmission unit that transmits the target average value calculated by the target average value calculation unit to another display control device; and a luminance information reception unit that receives, from the another display control device, luminance information regarding luminance of a whole of the image, the luminance information corresponding to an overall average value that is an average value of the luminance of the whole of the image calculated with use of the target average value.

In the second aspect of the present technology, in a case where an image is divided into a plurality of areas and a plurality of display control devices controls display of the image in respective areas, the image in one of the plurality of areas is set as a display control target, a target average value is calculated that is an average value of luminance of the display control target, the target average value is transmitted to another display control device, and luminance information is received from the another display control device, the luminance information regarding luminance of a whole of the image, the luminance information corresponding to an overall average value that is an average value of the luminance of the whole of image calculated with use of the target average value.

A display device of a third aspect of the present technology is a display device including: an image acquisition unit that acquires, in a case where an image is divided into a plurality of areas and a plurality of display control devices controls display of the image in respective areas, the image in one of the areas as a display target, the areas being display control targets of the display control devices connected to the display device; a supply unit that supplies a temperature of the display device to the display control devices connected to the display device; a display control information acquisition unit that acquires display control information to be used for control of display luminance of the image, the display control information being calculated on the basis of the temperature by the display control devices connected to the display device; and a display section that displays the display target acquired by the image acquisition unit with display luminance corresponding to the display control information acquired by the display control information acquisition unit.

In the third aspect of the present technology, in a case where an image is divided into a plurality of areas and a plurality of display control devices controls display of the image in respective areas, the image in one of the areas that is a display control target of the display control device connected to the display device is acquired as a display target, a temperature of the display device is supplied to the display control device connected to the display device, display control information to be used for control of display luminance of the image is acquired, the display control information being calculated on the basis of the temperature by the display control device connected to the display device, and the display target is displayed with display luminance corresponding to the display control information.

The display control device and the display device each may be an independent device, or may be a module incorporated into another device.

Note that it is possible to implement the display control devices of the first and second aspects by causing a computer to execute a program.

Furthermore, in order to implement the display control devices of the first and second aspects, the program to be executed by the computer can be provided by being transmitted via a transmission medium or by being recorded on a recording medium.

MODE FOR CARRYING OUT THE INVENTION

One Embodiment

<Configuration Example of Display System>

Figure 1:
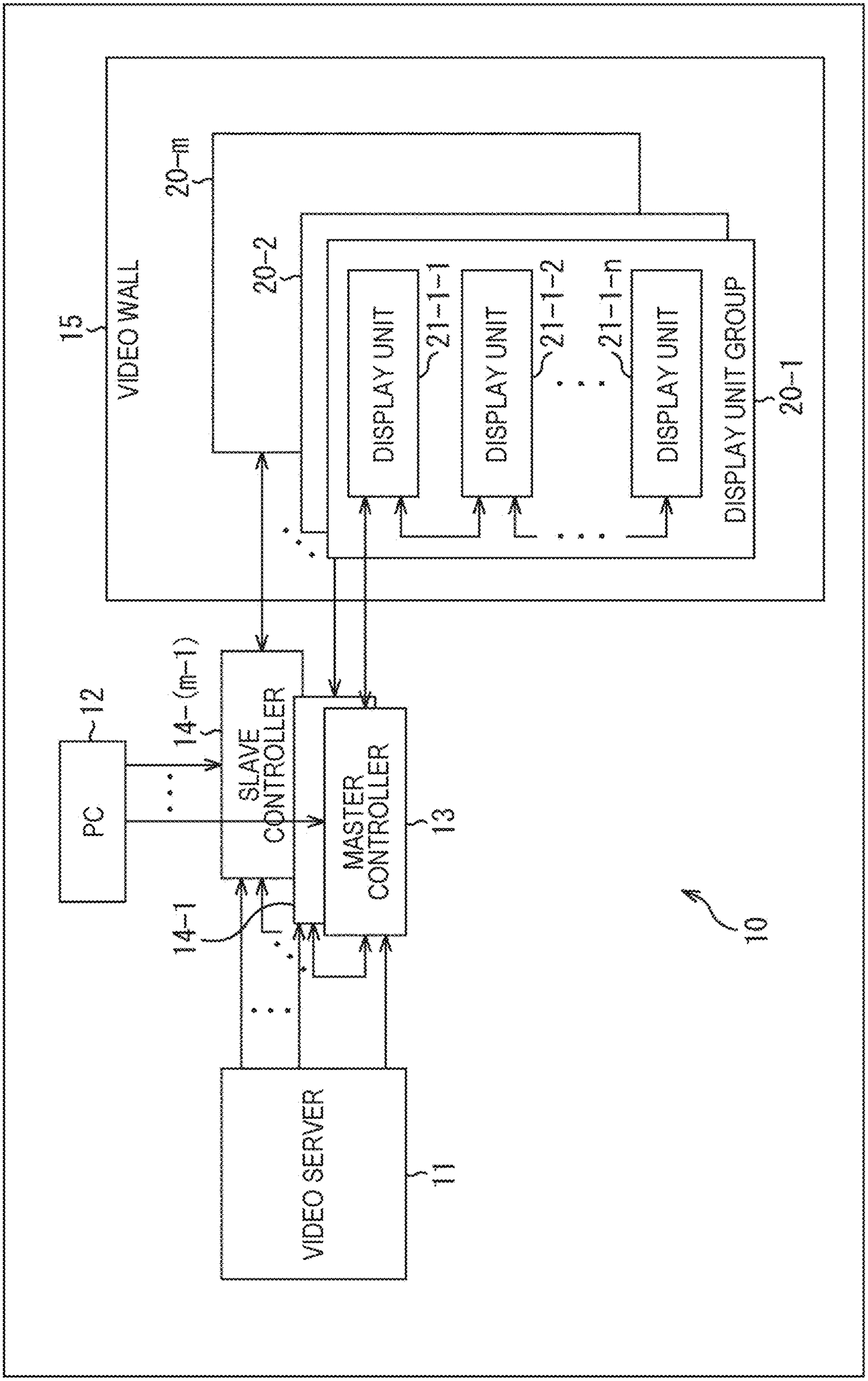
FIG. 1 is a block diagram illustrating a configuration example of a first embodiment of a display system to which the present technology is applied.

FIG. 1 is a block diagram illustrating a configuration example of a first embodiment of a display system including a master controller and a slave controller as display control devices and a video wall as a display device to which the present technology is applied.

A display system 10 in FIG. 1 includes a video server 11, a personal computer (PC) 12, a master controller 13, m−1 (m is an integer greater than 1) slave controllers 14-1 to 14-($m$−1), and a video wall 15. In the display system 10, for example, an image to be displayed having a resolution exceeding 4k resolution is divided into m areas, and the master controller 13 and the slave controllers 14-1 to 14-($m$−1) control display of the image in respective areas.

Specifically, the video server 11 includes, for example, a server computer. The video server 11 supplies an image in units of frames such as video content as an image to be displayed to the master controller 13 and the slave controllers 14-1 to 14-($m$−1). The image to be displayed may be provided to the master controller 13 and the slave controllers 14-1 to 14-($m$−1) from a recording medium such as a PC or a Blu-ray Disc (BD) (registered trademark) instead of the video server 11.

The PC 12 is a common general-purpose computer. The PC 12 transmits a control command to the master controller 13 and the slave controllers 14-1 to 14-($m$−1) as necessary.

The master controller 13 and the slave controllers 14-1 to 14-($m$−1) are display control devices that control display of the image in respective areas of the image to be displayed divided into m areas. The master controller 13 is a main display control device among the m display control devices, and the slave controllers 14-1 to 14-($m$−1) are display control devices dependent on the master controller 13. For example, m is 20.

The master controller 13 and the slave controllers 14-1 to 14-($m$−1) are connected to each other in series. Specifically, the master controller 13 is connected to the slave controller 14-1, and then the slave controller 14-$k$ (k is an integer from 1 to m−2) and the slave controller 14-($k$+1) are connected to each other in order. Note that, hereinafter, in a case where it is not necessary to individually distinguish the slave controllers 14-1 to 14-($m$−1) from each other, they are simply referred to as slave controllers 14.

The master controller 13 controls a display unit group 20-1 including n display units 21-1-1 to 21-1-$n$ among m×n (n is an integer greater than or equal to 1) display units 21-1-1 to 21-$m$-$n$ (cabinets) constituting the video wall 15. The master controller 13 is connected to one display unit 21-1-1 of the display unit group 20-1. Note that, hereinafter, in a case where it is not necessary to individually distinguish the display unit 21-1-1 to 21-$m$-$n$ from each other, they are simply referred to as display units 21.

In accordance with a control command supplied from the PC 12, the master controller 13 divides an image to be displayed supplied from the video server 11 into m areas, and sets the image in one of the m areas as a display control target. The master controller 13 supplies the display control target as an area image to be displayed to the display unit 21-1-1.

The master controller 13 also calculates a target average value that is an average value (average picture level (APL) value) of luminance values of the display control target. The master controller 13 acquires a temperature of each display unit 21 constituting the display unit group 20-1 from the display unit 21-1-1. The master controller 13 corrects the target average value on the basis of the temperature.

The master controller 13 transmits, to the slave controller 14-1 connected to the master controller 13, a collection packet that is a packet in which a non-target average value is to be stored that is an average value of luminance values for each area of an image other than the display control target in the image to be displayed. As a result, the master controller 13 receives a non-target average packet in which non-target average values of respective areas are stored from the slave controller 14-1. Then, the master controller 13 calculates an overall average value that is an average value of luminance values of an entire image to be displayed, on the basis of the non-target average values of respective areas stored in the non-target average packet and the corrected target average value. The master controller 13 transmits, to the slave controller 14-1, an overall average packet that is a packet in which the overall average value is stored as luminance information regarding luminance of the entire image to be displayed.

The master controller 13 also generates a display current value that is a current value when the video wall 15 displays the image to be displayed, as display control information to be used for control of display luminance of the image to be displayed, on the basis of the overall average value. The master controller 13 supplies the display current value to the display unit 21-1-1.

The slave controller 14 controls a display unit group including n display units 21 whose display is not controlled by the master controller 13 or another slave controller 14 among the m×n display units 21 constituting the video wall 15. Specifically, the slave controllers 14-1 to 14-($m$−1) control display unit groups 20-2 to 21-$m$, respectively. A display unit group 20-$i$ (i is an integer greater than or equal to 2 and less than or equal to m) includes n display units 21-$i$-1 to 21-$i$-$n$. Note that, hereinafter, in a case where it is not necessary to individually distinguish the display units 20-1 to 20-$m$ from each other, they are simply referred to as display unit groups 20. The slave controller 14 is connected to one display unit 21-$i$-1 of the display unit group 20 controlled by the slave controller 14.

The slave controller 14 divides the image to be displayed supplied from the video server 11 into m areas in accordance with a control command supplied from the PC 12. The slave controller 14 sets, as a display control target, the image in one area that is not set as a display control target by the master controller 13 and another slave controller 14 among the m areas. The slave controller 14 supplies the display control target as an area image to be displayed to the display unit 21-$i$-1.

The slave controller 14 also calculates a target average value. The slave controller 14 acquires, from the display unit 21-$i$-1, a temperature of each display unit 21 of the display unit group 20 including the display unit 21-$i$-1. The slave controller 14 corrects the target average value on the basis of the temperature.

The slave controller 14 receives the collection packet from the master controller 13 or another slave controller 14, which is connected at the preceding stage to the slave controller 14. Each of the slave controllers 14-1 to 14-($m$−2) stores the corrected target average value in the collection packet and transmits the corrected target average value to the slave controller 14 at the subsequent stage connected to a corresponding one of the slave controllers 14-1 to 14-($m$−2).

The slave controller 14-($m$−1) at the rearmost stage does not have the slave controller 14 at the subsequent stage connected to the slave controller 14-($m$−1). Thus, after storing the corrected target average value in the collection packet, the slave controller 14-($m$−1) returns the collection packet to the slave controller 14-($m$−2) at the preceding stage connected to the slave controller 14-($m$−1).

Each of the slave controllers 14-1 to 14-($m$−2) receives the collection packet returned from the slave controller 14 at the subsequent stage connected to a corresponding one of the slave controllers 14-1 to 14-($m$−2), and transmits the collection packet to the slave controller 14 or the master controller 13 at the preceding stage connected to a corresponding one of the slave controllers 14-1 to 14-($m$−2). As a result, the collection packet in which the corrected target average value of each slave controller 14 is stored as a non-target average value is transmitted from the slave controller 14-1 at the front-most stage to the master controller 13.

The slave controller 14 receives the overall average packet from the master controller 13 or another slave controller 14, which is connected at the preceding stage to the slave controller 14. Each of the slave controllers 14-1 to 14-($m$−2) transmits the overall average packet to the slave controller 14-2 at the subsequent stage. The slave controller 14 generates a display current value as display control information on the basis of the overall average value. The slave controller 14 supplies the display current value to the display unit 21-$i$-1.

The video wall 15 is a large light emitting diode (LED) direct-view display in which m×n display units 21 are arranged in a tile shape. The display units 21 are divided into the display unit groups 20-1 to 20-$m$ every n display units 21.

The n display units 21 constituting each display unit group 20 are connected to each other in series. The display units 21-1-1 and **21-*i*-1 at the front-most stage in the display unit groups 20 are connected to the master controller 13 or the slave controller 14 that controls a corresponding one of the display unit groups 20. The display units 21-1-1 and 21-*i*-1 acquire the area image to be displayed and the display current value from the master controller 13 or the slave controller 14 connected to a corresponding one of the display units 21-1-1 and 21-*i*-1. The area image and the display current value acquired by the display units 21-1-1 and 21-*i*-1 are sequentially transmitted to the display units 21** at the subsequent stage.

The display unit 21 divides the area image to be displayed into n areas, and extracts the image in one area that is not displayed on another display unit 21 among the n areas as a divided area image to be displayed. The display unit 21 displays the divided area image to be displayed on the basis of the display current value. As a result, the area image to be displayed is displayed on the entire display unit group 20 with a display luminance corresponding to the display current value. As described above, the area image to be displayed is displayed on all the display unit groups 20, whereby an image of one frame to be displayed is displayed on the entire video wall 15.

Each display unit 21 measures a temperature of the display unit 21. The display unit 21 at the rearmost stage of the display unit group 20-1 transmits the temperature of the display unit 21 to another display unit 21 at the preceding stage connected to the display unit 21. Each display unit 21 at other than the rearmost stage acquires, from another display unit 21 at the subsequent stage connected to the display unit 21, temperatures of the another display unit 21 and after the another display unit 21. Each display unit 21 at other than the rearmost stage supplies the acquired temperatures together with the temperature of the display unit 21 to another display unit 21, the master controller 13, or the slave controller 14 at the preceding stage connected to the display unit 21.

Note that the master controller 13, the slave controller 14, and the video wall 15 may have an integrated configuration, or may be a display device in which they are integrated. Furthermore, the PC 12, the master controller 13, the slave controller 14, and the video wall 15 may have an integrated configuration, or may be a display device in which they are integrated.

The numbers n, which are the numbers of the display units 21 constituting the display unit groups 20, may all be the same or different from each other.

<Arrangement Example of Display Units>

Figure 2:
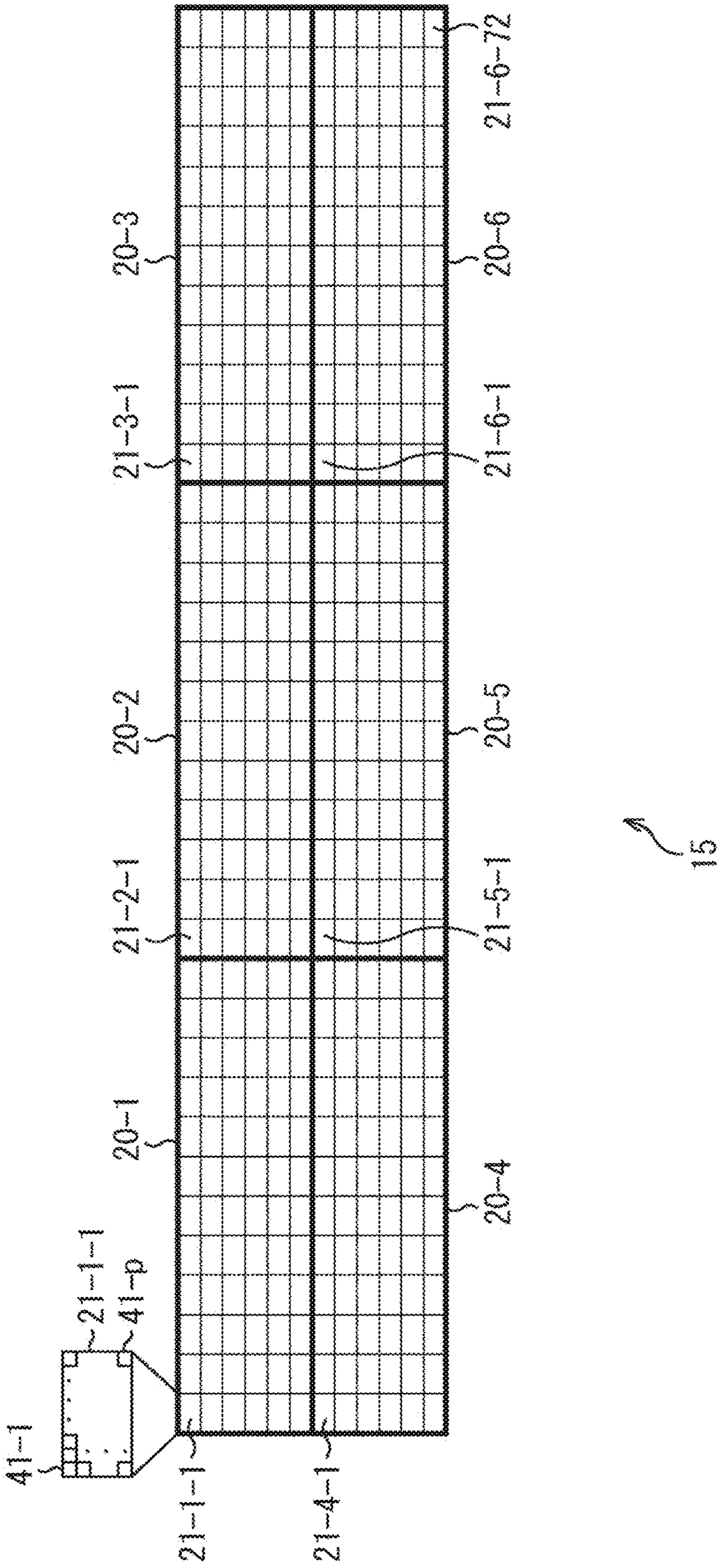
FIG. 2 is a diagram illustrating an arrangement example of display units.

FIG. 2 is a diagram illustrating an arrangement example of the display units in the video wall 15 in FIG. 1.

As illustrated in FIG. 2, the video wall 15 includes an arrangement of the display unit 21 in a tile shape. In the example in FIG. 2, the video wall 15 includes 432 display units 21 of 12 (rows)×36 (columns), and is divided into six display unit groups 20-1 to 20-6 for every 72 display units of 6 (rows)×12 (columns). That is, in the example in FIG. 2, m is 6, and n is 72. These are similar in FIG. 10 described later.

The display unit 21 includes an arrangement of p (p is an integer greater than or equal to 1) LED arrays 41-1 to **41-*p* in which red, green, or blue LEDs (not illustrated) corresponding to pixels are arranged in a matrix in a tile shape. Note that, hereinafter, in a case where it is not necessary to individually distinguish the LED arrays 41-1 to 41-*p* from each other, they are simply referred to as LED arrays 41**.

<Configuration Example of Master Controller>

Figure 3:
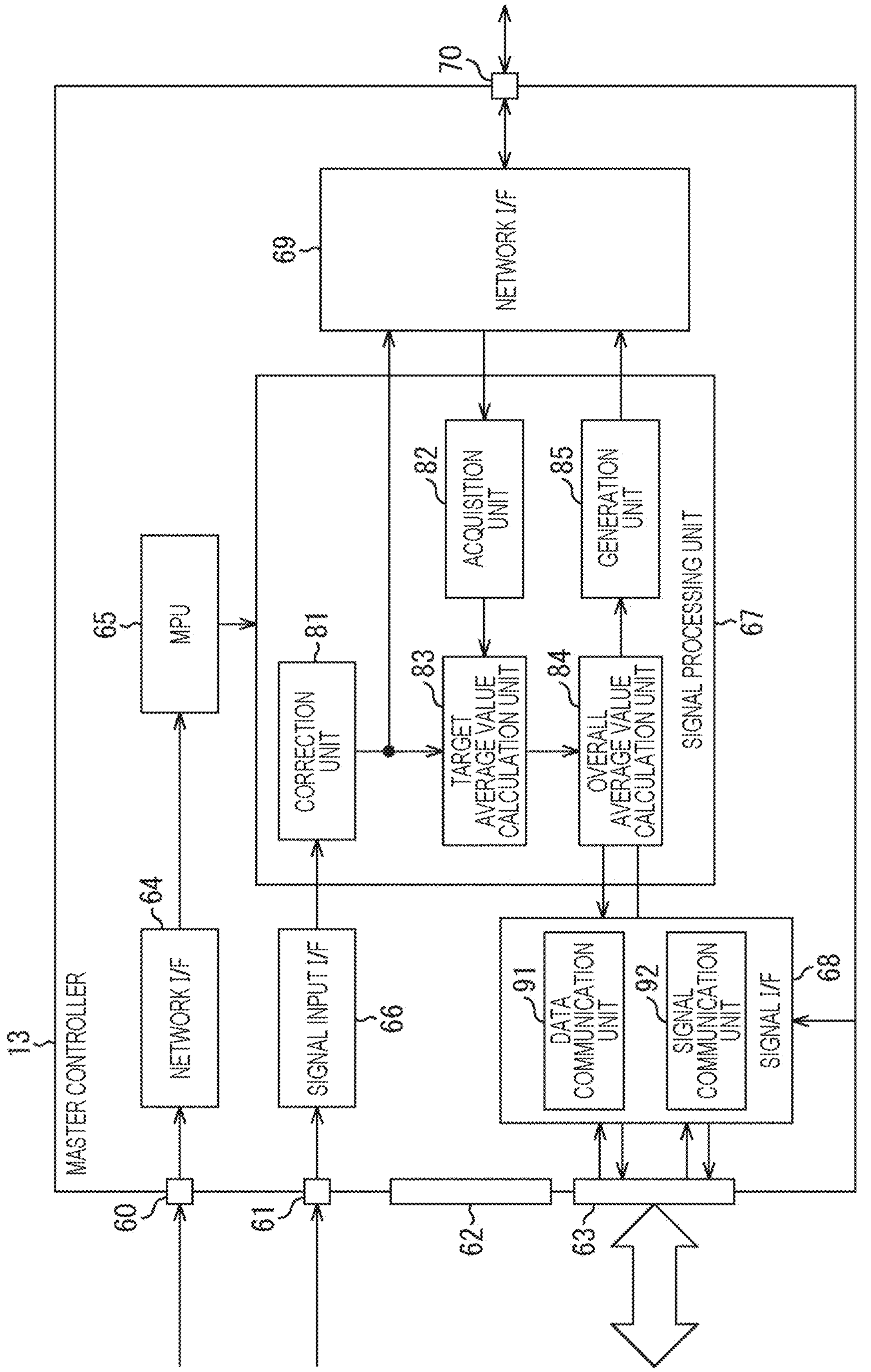
FIG. 3 is a block diagram illustrating a configuration example of a master controller.

FIG. 3 is a block diagram illustrating a configuration example of the master controller 13 in FIG. 1.

As illustrated in FIG. 3, the master controller 13 includes a local area network (LAN) terminal 60, a high definition multimedia interface (HDMI) (registered trademark) terminal 61, a LINK IN terminal 62, a LINK OUT terminal 63, a network I/F 64, a micro processor unit (MPU) 65, a signal input I/F 66, a signal processing unit 67, a signal I/F 68, a network I/F 69, and a LAN terminal 70.

The LAN terminal 60 is a connection terminal of a LAN cable, and is connected to a LAN cable connected to the PC 12 in FIG. 1. The LAN terminal 60 receives a control command from the PC 12 via the LAN cable, and supplies the control command to the MPU 65 via the network I/F 64.

The HDMI terminal 61 is an image input terminal and is connected to the video server 11. The HDMI terminal 61 receives an image in units of frames to be displayed transmitted from the video server 11, and supplies the image to the signal input I/F 66.

The LINK IN terminal 62 and the LINK OUT terminal 63 are terminals for connection via LAN cables. Nothing is connected to the LINK IN terminal 62, but the slave controller 14-1 is connected to the LINK OUT terminal 63. The LINK OUT terminal 63 receives a data packet such as the collection packet, and a synchronization signal, transmitted from the slave controller 14-1, and supplies the data packet and the synchronization signal to the signal I/F 68. The LINK OUT terminal 63 transmits data packets such as the collection packet and the overall average packet, and a synchronization signal, supplied from the signal I/F 68 to the slave controller 14-1.

The MPU 65 controls each unit of the signal processing unit 67 in accordance with a control command supplied via the network I/F 64.

The signal input I/F 66 converts the image in units of frames to be displayed supplied from the HDMI terminal 61 into an image in units of frames in a predetermined video format. Specifically, the signal input I/F 66 converts the image into an image including pixel values of red (R), green (G), and blue (B) pixels constituting a frame, for example. The signal input I/F 66 supplies the converted image to the signal processing unit 67.

The signal processing unit 67 includes a correction unit 81, an acquisition unit 82, a target average value calculation unit 83, an overall average value calculation unit 84, and a generation unit 85.

The correction unit 81 divides the image supplied from the signal input I/F 66 into a plurality of areas, and extracts the image in one area that is not the display control target of the slave controller 14 among the plurality of areas as the display control target of the master controller 13. The correction unit 81 performs gamma correction on the extracted display control target. The correction unit 81 supplies the display control target after the gamma correction to the network I/F 69 and the target average value calculation unit 83.

The acquisition unit 82 acquires a current temperature of each of the display units 21-1-1 to **21-1-*n* supplied from the network I/F 69. The acquisition unit 82 supplies the temperature to the target average value calculation unit 83**.

The target average value calculation unit 83 calculates a target average value on the basis of the display control target supplied from the correction unit 81. Specifically, the target average value calculation unit 83 calculates the target average value by adding and averaging the pixel values of the red, green, and blue pixels constituting the display control target. The target average value calculation unit 83 corrects the target average value on the basis of the temperature supplied from the acquisition unit 182. Specifically, the target average value calculation unit 83 multiplies the target average value by a temperature coefficient based on the temperature. The target average value calculation unit 83 supplies the corrected target average value to the overall average value calculation unit 84.

The overall average value calculation unit 84 calculates an overall average value on the basis of the target average value supplied from the target average value calculation unit 83 and non-target average values of respective areas supplied from the signal I/F 68. Specifically, the overall average value calculation unit 84 calculates the overall average value by adding the target average value and the non-target average values of respective areas together and dividing the sum by m. The overall average value calculation unit 84 supplies the overall average value to the signal I/F 68 and the generation unit 85.

The generation unit 85 generates a display current value as display control information on the basis of the overall average value supplied from the overall average value calculation unit 84, and supplies the display current value to the network I/F 69.

The signal I/F 68 includes a data communication unit 91 and a signal communication unit 92.

The data communication unit 91 generates a collection packet in which a non-target average value is not stored in synchronization with a frame, and supplies the collection packet to the LINK OUT terminal 63. The data communication unit 91 extracts the non-target average values of respective areas from the collection packet supplied from the LINK OUT terminal 63, and supplies the non-target average values to the overall average value calculation unit 84. The data communication unit 91 supplies the overall average packet storing the overall average value supplied from the overall average value calculation unit 84 to the LINK OUT terminal 63.

The signal communication unit 92 generates a synchronization signal on the basis of a reference sync input from the outside and supplies the synchronization signal to the LINK OUT terminal 63. The synchronization signal is also supplied to each unit of the master controller 13. The signal communication unit 92 acquires a synchronization signal supplied from the LINK OUT terminal 63.

The network I/F 69 supplies the display control target supplied from the correction unit 81 to the LAN terminal 70 as an area image to be displayed. The network I/F 69 supplies the display current value supplied from the generation unit 85 to the LAN terminal 70. The network I/F 69 supplies the temperature of each of the display units 21-1-1 to 21-1-$n$ supplied from the LAN terminal 70 to the acquisition unit 82.

The LAN terminal 70 is a connection terminal of a LAN cable, and is connected to a LAN cable connected to the display unit 21-1-1. The LAN terminal 70 transmits the area image and the display current value supplied from the network I/F 69 to the display unit 21-1-1. The LAN terminal 70 receives the temperature of each of the display units 21-1-1 to 21-1-$n$ from the display unit 21-1-1 via the LAN cable, and supplies the temperature to the network I/F 69.

Note that, in the example in FIG. 3, the master controller 13 is connected to the video server 11 via the HDMI terminal 61, but a DP terminal or a DVI terminal may be provided instead of the HDMI terminal 61, and the master controller 13 may be connected to the video server 11 via the DP terminal or the DVI terminal.

<Functional Configuration Example of Data Communication Unit>

Figure 4:
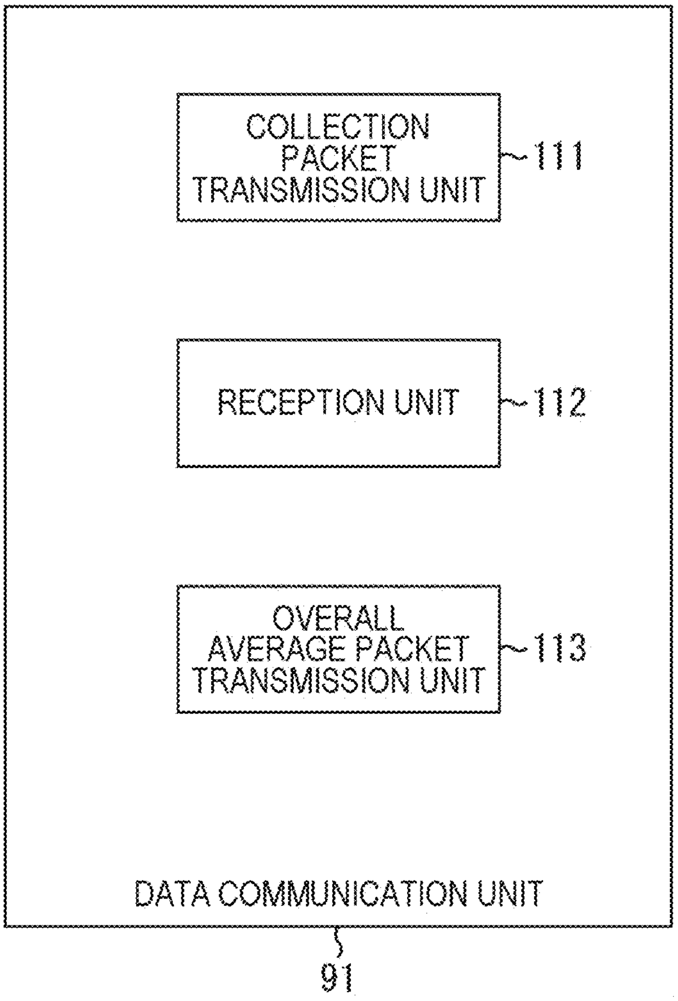
FIG. 4 is a block diagram illustrating a functional configuration example of a data communication unit in FIG. 3.

FIG. 4 is a block diagram illustrating a configuration example of the data communication unit 91 in FIG. 3.

As illustrated in FIG. 4, the data communication unit 91 includes a collection packet transmission unit 111, a reception unit 112, and an overall average packet transmission unit 113.

The collection packet transmission unit 111 (packet transmission unit) generates a collection packet in which a non-target average value is not stored in synchronization with a frame, and supplies the generated collection packet to the LINK OUT terminal 63.

The reception unit 112 receives the collection packet in which the non-target average values of respective areas supplied from the LINK OUT terminal 63 are stored. The reception unit 112 extracts the non-target average values of respective areas from the collection packet, and supplies the non-target average values to the overall average value calculation unit 84.

The overall average packet transmission unit 113 (luminance information transmission unit) generates an overall average packet storing the overall average value supplied from the overall average value calculation unit 84. The overall average packet transmission unit 113 supplies the overall average packet to the LINK OUT terminal 63.

<Configuration Example of Slave Controller>

Figure 5:
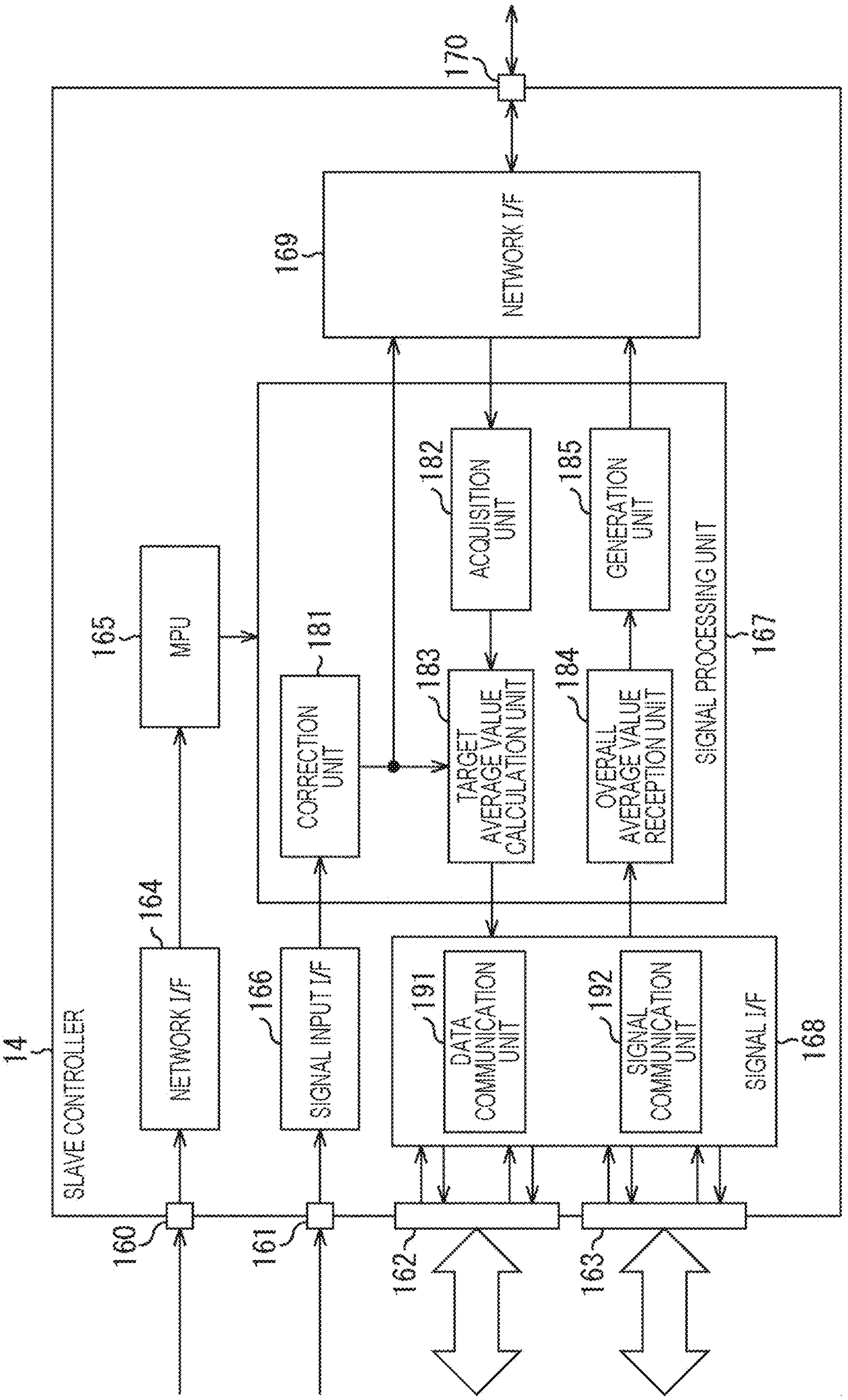
FIG. 5 is a block diagram illustrating a configuration example of a slave controller.

FIG. 5 is a block diagram illustrating a configuration example of the slave controller 14 in FIG. 1.

As illustrated in FIG. 5, the slave controller 14 includes a LAN terminal 160, an HDMI terminal 161, a LINK IN terminal 162, a LINK OUT terminal 163, a network I/F 164, an MPU 165, a signal input I/F 166, a signal processing unit 167, a signal I/F 168, a network I/F 169, and a LAN terminal 170.

Since the LAN terminal 160 and the HDMI terminal 161 are similar to the LAN terminal 60 and the HDMI terminal 61 in FIG. 3, respectively, the description thereof is omitted.

The LINK IN terminal 162 and the LINK OUT terminal 163 are terminals for connection via LAN cables.

The master controller 13 or the slave controller 14 at the preceding stage is connected to the LINK IN terminal 162. The LINK IN terminal 162 receives data packets such as the collection packet and the overall average packet, and the synchronization signal, transmitted from the master controller 13 or the slave controller 14 at the preceding stage, and supplies the data packets and the synchronization signal to the signal I/F 168. The LINK IN terminal 162 transmits a data packet such as the collection packet and the synchronization signal supplied from the signal I/F 168 to the master controller 13 or the slave controller 14 at the preceding stage.

The LINK OUT terminal 163 is connected to the slave controller 14 at the subsequent stage. Note that, since the slave controller 14-($m$−1) at the rearmost stage does not include the slave controller 14 at the subsequent stage, nothing is connected to the LINK OUT terminal 163.

The LINK OUT terminal 163 receives a data packet such as the collection packet, and the synchronization signal, transmitted from the slave controller 14 at the subsequent stage, and supplies the data packet and the synchronization signal to the signal I/F 168. The LINK OUT terminal 163 transmits a data packet such as the collection packet and the overall average packet, and the synchronization signal, supplied from the signal I/F 168 to the slave controller 14 at the subsequent stage.

Since the network I/F 164, the MPU 165, and the signal input I/F 166 are configured similarly to the network I/F 64, the MPU 65, and the signal input I/F 66 in FIG. 3, respectively, the description thereof is omitted.

The signal processing unit 167 includes a correction unit 181, an acquisition unit 182, a target average value calculation unit 183, an overall average value reception unit 184, and a generation unit 185.

The correction unit 181 divides the image supplied from the signal input I/F 166 into a plurality of areas. The correction unit 181 extracts, as a display control target of the slave controller 14, the image in one area that is not a display control target of the master controller 13 and another slave controller 14 among the plurality of areas. The correction unit 181 performs gamma correction on the extracted display control target. The correction unit 181 supplies the display control target after the gamma correction to the network I/F 169 and the target average value calculation unit 183.

The acquisition unit 182 acquires a current temperature of each display unit 21 of the display unit group 20 whose display is controlled by the slave controller 14, which is supplied from the network I/F 169. The acquisition unit 182 supplies the temperature to the target average value calculation unit 183.

Similarly to the target average value calculation unit 83 in FIG. 3, the target average value calculation unit 183 calculates a target average value on the basis of the display control target supplied from the correction unit 181. Similarly to the target average value calculation unit 83, the target average value calculation unit 183 corrects the target average value on the basis of the temperature supplied from the acquisition unit 182, and supplies the corrected target average value to the signal I/F 168.

The overall average value reception unit 184 (luminance information reception unit) receives the overall average value supplied from the signal I/F 168. The overall average value reception unit 184 supplies the overall average value to the generation unit 185.

The generation unit 185 generates a display current value as display control information on the basis of the overall average value supplied from the overall average value reception unit 184, and supplies the display current value to the network I/F 169.

The signal I/F 168 includes a data communication unit 191 and a signal communication unit 192.

The data communication unit 191 acquires the collection packet supplied from the LINK IN terminal 162. The data communication unit 191 stores the corrected target average value supplied from the target average value calculation unit 183 in the collection packet as the non-target average value of the area corresponding to the display control target.

The data communication unit 191 of each of the slave controllers 14-1 to 14-($m$−2) at other than the rearmost stage supplies the collection packet in which the non-target average value is stored to the LINK OUT terminal 163. The data communication unit 191 of the slave controller 14-($m$−1) at the rearmost stage supplies the collection packet in which the non-target average value is stored, that is, the collection packet in which all the non-target average values are stored, to the LINK IN terminal 162.

The data communication unit 191 supplies the overall average packet supplied from the LINK IN terminal 162 to the overall average value reception unit 184. The data communication unit 191 of each of the slave controllers 14-1 to 14-($m$−2) at other than the rearmost stage supplies the overall average packet to the LINK OUT terminal 163. The data communication unit 191 supplies the collection packet in which all the non-target average values supplied from the LINK OUT terminal 163 are stored to the LINK IN terminal 162.

The signal communication unit 192 supplies a synchronization signal supplied from the LINK IN terminal 162 to each unit of the slave controller 14. The signal communication unit 192 of each of the slave controllers 14-1 to 14-($m$−2) at other than the rearmost stage supplies the synchronization signal to the LINK OUT terminal 163. The signal communication unit 192 of the slave controller 14-($m$−1) at the rearmost stage supplies the synchronization signal to the LINK IN terminal 162. The signal communication unit 192 supplies a synchronization signal supplied from the LINK OUT terminal 163 to the LINK IN terminal 162.

The network I/F 169 supplies the display control target supplied from the correction unit 181 to the LAN terminal 70 as an area image to be displayed. The network I/F 69 supplies the display current value supplied from the generation unit 185 to the LAN terminal 170. The network I/F 169 supplies, to the acquisition unit 182, the temperature of each display unit 21 of the display unit group 20 whose display is controlled by the slave controller 14, which is supplied from the LAN terminal 170.

The LAN terminal 170 is a connection terminal of a LAN cable. The LAN terminal 170 is connected to a LAN cable connected to the display unit 21-$i$-1 at the front-most stage in the display unit group 20 whose display is controlled by the slave controller 14. The LAN terminal 170 transmits the area image and the display current value supplied from the network I/F 169 to the display unit 21-$i$-1. The LAN terminal 170 receives the temperature of each of the display units 21 of the display unit group 20-$i$ from the display unit 21-$i$-1 via the LAN cable. The LAN terminal 170 supplies the temperature to the network I/F 169.

Note that, in the example in FIG. 5, the slave controller 14 is connected to the video server 11 via the HDMI terminal 161, but a DP terminal or a DVI terminal may be provided instead of the HDMI terminal 161, and the slave controller 14 may be connected to the video server 11 via the DP terminal or the DVI terminal.

<Functional Configuration Example of Data Communication Unit>

Figure 6:
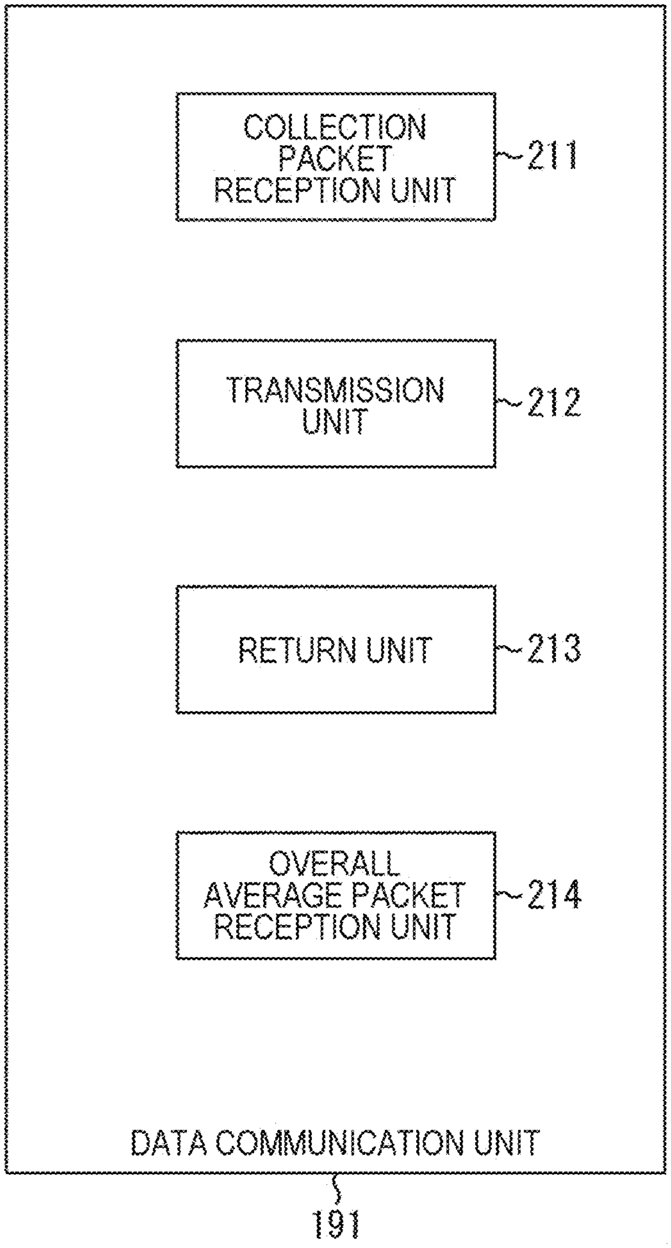
FIG. 6 is a block diagram illustrating a functional configuration example of a data communication unit in FIG. 5.

FIG. 6 is a block diagram illustrating a functional configuration example of the data communication unit 191 in FIG. 5.

As illustrated in FIG. 6, the data communication unit 191 includes a collection packet reception unit 211, a transmission unit 212, a return unit 213, and an overall average packet reception unit 214.

The collection packet reception unit 211 (packet reception unit) acquires the collection packet supplied from the LINK IN terminal 162. The collection packet reception unit 211 stores the corrected target average value supplied from the target average value calculation unit 183 in the collection packet as the non-target average value of the area corresponding to the display control target. The collection packet reception unit 211 of the slave controller 14 other than the slave controller 14 at the rearmost stage supplies the collection packet in which the non-target average value is stored to the transmission unit 212. The collection packet reception unit 211 of the slave controller 14 at the rearmost stage supplies the collection packet in which the non-target average value is stored, that is, the collection packet in which all the non-target average values are stored, to the return unit 213. The collection packet reception unit 211 acquires the collection packet in which all the non-target average values supplied from the LINK OUT terminal 163 are stored, and supplies the collection packet to the return unit 213.

The transmission unit 212 supplies the collection packet supplied from the collection packet reception unit 211 to the LINK OUT terminal 163. The transmission unit 212 supplies the overall average packet supplied from the overall average packet reception unit 214 to the LINK OUT terminal 163.

The return unit 213 (transmission unit) supplies the collection packet in which all the non-target average values supplied from the collection packet reception unit 211 are stored to the LINK IN terminal 162.

The overall average packet reception unit 214 supplies the overall average packet supplied from the LINK IN terminal 162 to the overall average value reception unit 184. The overall average packet reception unit 214 of the slave controller 14 other than the slave controller 14 at the rearmost stage supplies the overall average packet also to the transmission unit 212.

<Configuration Examples of Overall Average Packet and Collection Packet>

Figure 7:
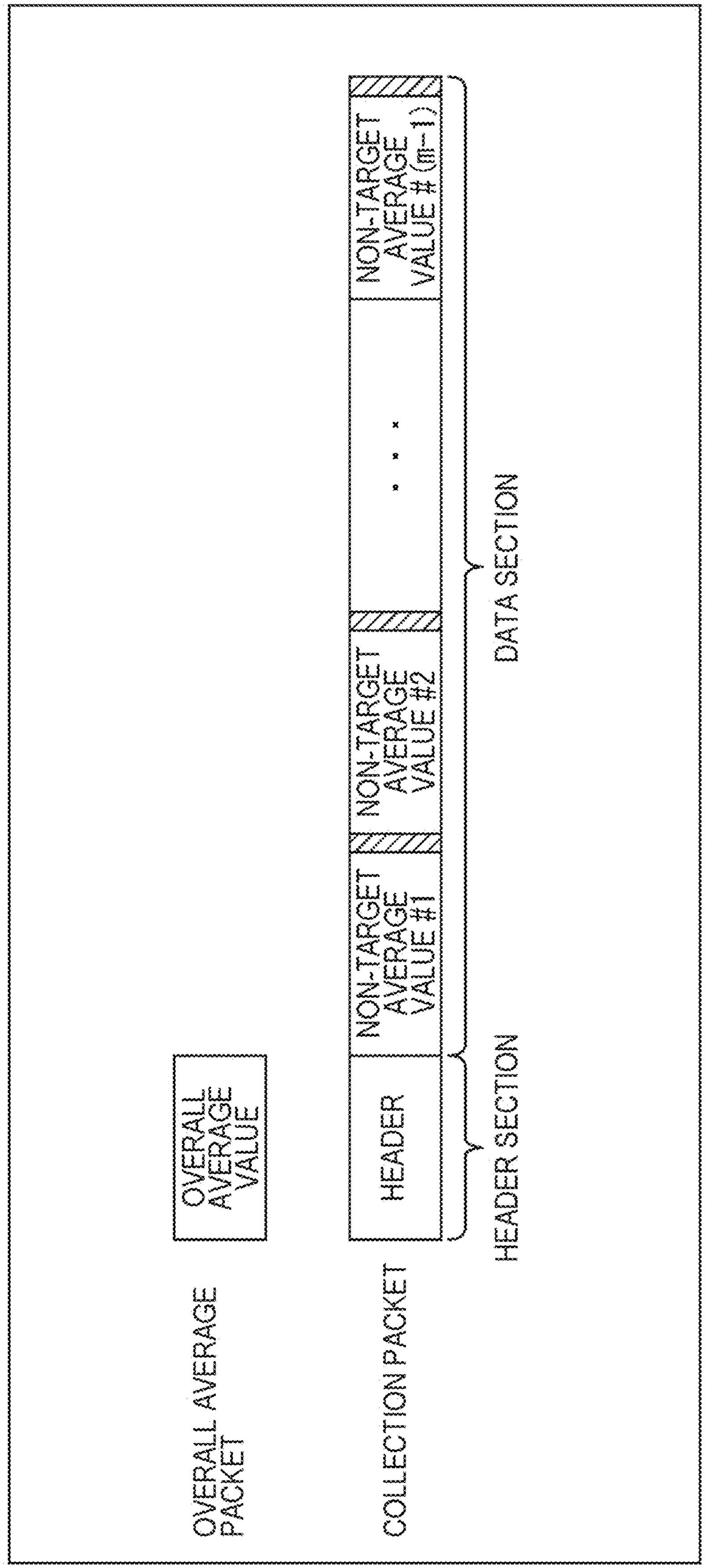
FIG. 7 is a diagram illustrating configuration examples of an overall average packet and a collection packet.

FIG. 7 is a diagram illustrating configuration examples of the overall average packet and the collection packet.

As illustrated in FIG. 7, the overall average value is stored in the overall average packet. The collection packet includes a header section and a data section. In the header section, a header is stored by the slave controller 14-1, for example.

In the data section, m−1 non-target average values are stored by m−1 slave controllers 14. In FIG. 7, the non-target average value stored by the slave controller **14-*i*** is represented as a non-target average value #i. Note that the non-target average value is stored with 0 or the like added to a remainder area indicated by hatching in the figure so as to be data in units of predetermined bytes (for example, in units of four bytes).

<Configuration Example of Display Unit at Front-Most Stage>

Figure 8:
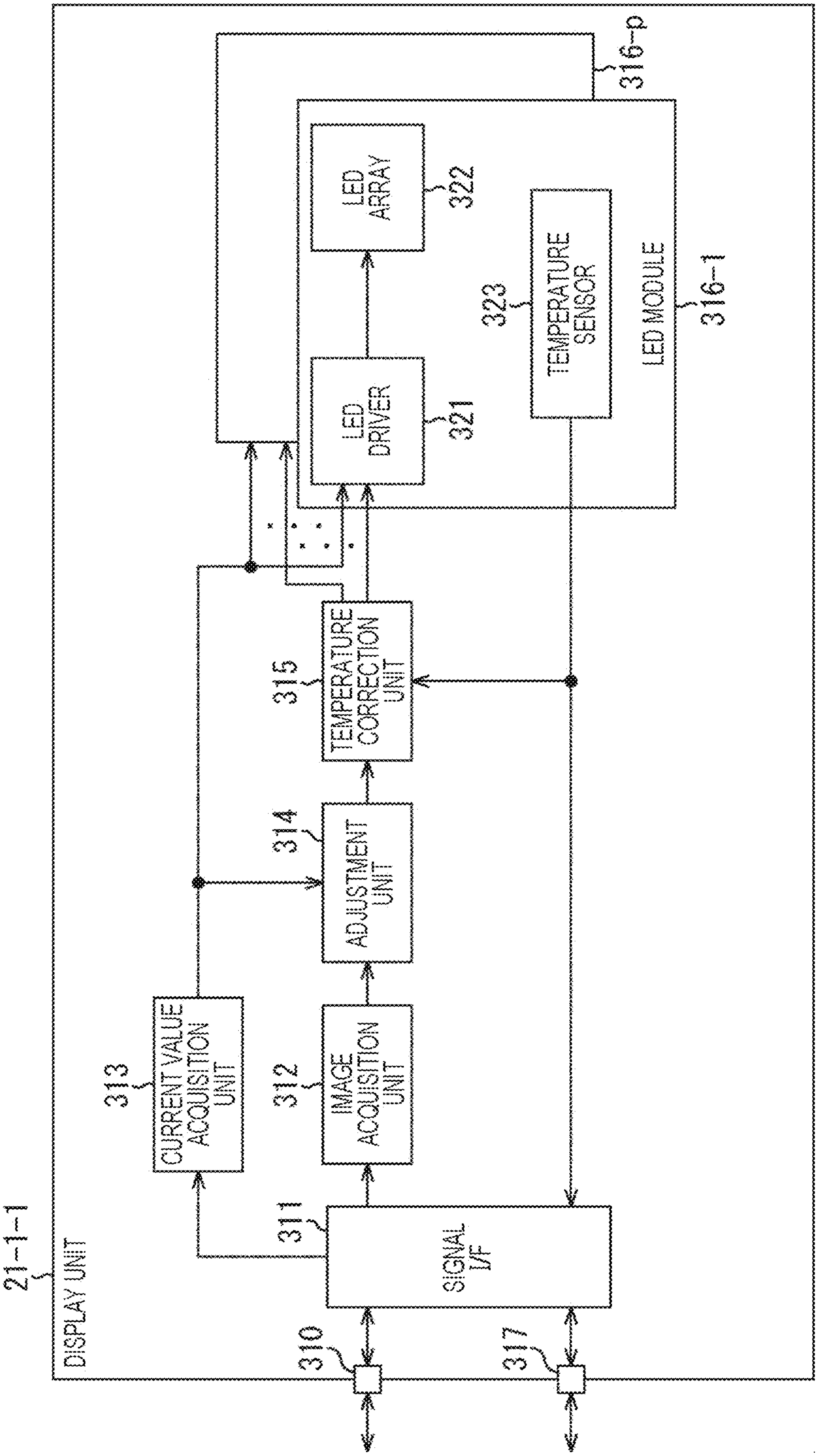
FIG. 8 is a block diagram illustrating a configuration example of a display unit at the front-most stage.

FIG. 8 is a block diagram illustrating a configuration example of the display unit 21-1-1.

The display unit 21-1-1 includes a SIGNAL IN terminal 310, a signal I/F 311, an image acquisition unit 312, a current value acquisition unit 313, an adjustment unit 314, a temperature correction unit 315, LED modules 316-1 to **316-*p*, and a SIGNAL OUT terminal 317**.

The SIGNAL IN terminal 310 is a connection terminal of a LAN cable, and is connected to a LAN cable connected to the master controller 13. Two pairs of lines among the four pairs of lines constituting the LAN cable are used for, for example, image (signal) communication, and one pair of lines is used for control signal communication. The SIGNAL IN terminal 310 receives the area image to be displayed and the display current value from the master controller 13 via the LAN cable, and supplies the area image and the display current value to the signal I/F 311. The SIGNAL IN terminal 310 transmits the temperature of each of the display units 21-1-1 to **21-1-*n* supplied from the signal I/F 311 to the master controller 13** via the LAN cable.

The signal I/F 311 supplies the area image supplied from the SIGNAL IN terminal 310 to the image acquisition unit 312 and the SIGNAL OUT terminal 317. The signal I/F 311 supplies the display current value supplied from the SIGNAL IN terminal 310 to the current value acquisition unit 313 and the SIGNAL OUT terminal 317. The signal I/F 311 (supply unit) supplies the temperature of the display unit 21-1-1, which is the temperature supplied from each of the LED modules 316-1 to **316-*p*, and the temperatures of the other display units 21-1-2 to 21-1-*n* supplied from the SIGNAL OUT terminal 317 to the SIGNAL IN terminal 310**.

The image acquisition unit 312 acquires the area image supplied from the signal I/F 311. The image acquisition unit 312 divides the area image to be displayed into n areas, and extracts the image in one area that is not displayed on the other display units 21 among the n areas as a divided area image to be displayed. The image acquisition unit 312 supplies the divided area image to the adjustment unit 314.

The current value acquisition unit 313 (display control information acquiring unit) acquires the display current value supplied from the signal I/F 311. The current value acquisition unit 313 supplies the display current value to the adjustment unit 314 and the LED modules 316-1 to **316-*p***.

The adjustment unit 314 includes, for example, a color space convertor (CSC). The adjustment unit 314 dynamically performs color correction such as white balance adjustment on the divided area image supplied from the image acquisition unit 312 on the basis of the display current value supplied from the current value acquisition unit 313. As a result, a chromaticity change of the divided area image due to a change in the display current value is reduced. The adjustment unit 314 supplies the divided area image after the color correction to the temperature correction unit 315.

The temperature correction unit 315 divides the divided area image supplied from the adjustment unit 314 into p areas respectively corresponding to the LED modules 316-1 to **316-*p*. Note that, hereinafter, in a case where it is not necessary to individually distinguish the LED modules 316-1 to 316-*p* from each other, they are simply referred to as LED modules 316. For each LED module 316, the temperature correction unit 315 performs luminance chromaticity correction on the divided area image of an area corresponding to the LED module 316 on the basis of the temperature supplied from the LED module 316. At this time, the temperature of another display unit 21 around the display unit 21-1-1 is also used as necessary. The temperature correction unit 315 supplies the divided area image after the luminance chromaticity correction of the area corresponding to each LED module 316 to the LED module 316**.

Each LED module 316 includes an LED driver 321, an LED array 322, and a temperature sensor 323. Note that the LED arrays 322 of the LED modules 316-1 to **316-*p* are the LED arrays 41-1 to 41-*p* constituting the display unit 21-1-1**.

The LED driver 321 performs pulse driving of each LED by performing pulse width modulation (PWM) control of light emission of each LED constituting the LED array 322 on the basis of the display current value supplied from the current value acquisition unit 313 and the divided area image supplied from the temperature correction unit 315. Specifically, the LED driver 321 supplies a current of the display current value to each LED, and causes each LED to perform pulse light emission with a pulse width (duty ratio) corresponding to a pixel value of each pixel of the divided area image. As a result, the divided area image is displayed on the LED array 322 (display section) with a display luminance corresponding to the display current value.

The temperature sensor 323 measures a temperature of the LED module 316 itself. The temperature sensor 323 supplies the measured temperature to the signal I/F 311 and the temperature correction unit 315.

The SIGNAL OUT terminal 317 is a connection terminal of a LAN cable, and is connected to the display unit 21-1-2 via the LAN cable. Two pairs of lines among the four pairs of lines constituting the LAN cable are used for, for example, image (signal) communication, and one pair of lines is used for control signal communication. The SIGNAL OUT terminal 317 transmits the area image and the display current value supplied from the signal I/F 311 to the display unit 21-1-2. The SIGNAL OUT terminal 317 receives the temperature of each of the display units 21-1-2 to **21-1-*n* transmitted from the display unit 21-1-2, and supplies the temperature to the signal I/F 311**.

Note that the temperature sensor 323 may be provided outside the LED module 316 in the display unit 21-1-1. In a case where the temperature sensor 323 is provided outside the LED module 316, one temperature sensor 323 may be provided for the display unit 21-1-1 to measure a temperature of the entire display unit 21-1-1. The number of the LED drivers 321 and the LED arrays 322 included in the LED module 316 may be plural.

Another display unit **21-*i*-1 at the front-most stage is different from the display unit 21-1-1 described with reference to FIG. 8 in that the slave controller 14 is connected to the SIGNAL IN terminal 310, and other than that, the display unit 21-*i*-1 is configured similarly to the display unit 21-1-1**, and thus, the description thereof is omitted.

<Configuration Example of Display Unit at Other than Front-Most Stage>

Figure 9:
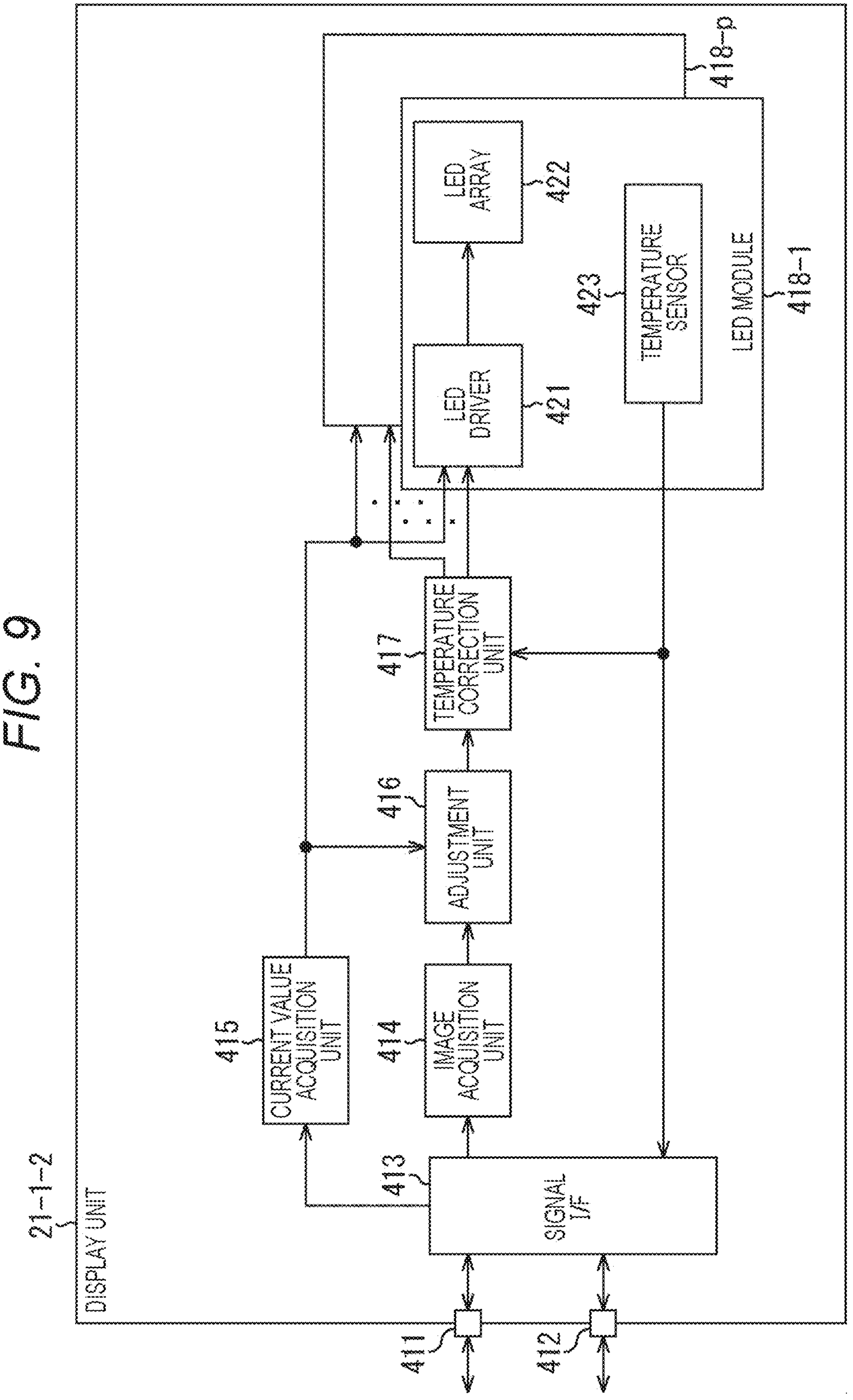
FIG. 9 is a block diagram illustrating a configuration example of a display unit at other than the front-most stage.

FIG. 9 is a block diagram illustrating a configuration example of the display unit 21-1-2.

The display unit 21-1-2 includes a SIGNAL IN terminal 411, a SIGNAL OUT terminal 412, a signal I/F 413, an image acquisition unit 414, a current value acquisition unit 415, an adjustment unit 416, a temperature correction unit 417, and LED modules 418-1 to **418-*p***.

The SIGNAL IN terminal 411 is a connection terminal of a LAN cable, and is connected to the display unit 21-1-1 at the preceding stage via the LAN cable. Two pairs of lines among the four pairs of lines constituting the LAN cable are used for, for example, image (signal) communication, and one pair of lines is used for control signal communication. The SIGNAL IN terminal 411 transmits the temperature of each of the display units 21-1-2 to **21-1-*n* supplied from the signal I/F 413 to the display unit 21-1-1. The SIGNAL IN terminal 411 receives the area image to be displayed and the display current value transmitted from the display unit 21-1-1, and supplies the area image and the display current value to the signal I/F 413**.

The SIGNAL OUT terminal 412 is a connection terminal of a LAN cable, and is connected to the display unit 21-1-3 at the subsequent stage via the LAN cable. Two pairs of lines among the four pairs of lines constituting the LAN cable are used for, for example, image (signal) communication, and one pair of lines is used for control signal communication. The SIGNAL OUT terminal 412 transmits the area image to be displayed and the display current value supplied from the signal I/F 413 to the display unit 21-1-3. The SIGNAL OUT terminal 412 receives the temperature of each of the display units 21-1-3 to **21-1-*n* transmitted from the display unit 21-1-3, and supplies the temperature to the signal I/F 413**.

The signal I/F 413 acquires the area image to be displayed and the display current value supplied from the SIGNAL IN terminal 411, and supplies the area image and the display current value to the SIGNAL OUT terminal 412 and the image acquisition unit 414. The signal I/F 413 acquires the temperature of the display unit 21-1-2, which is the temperature supplied from each of the LED modules 418-1 to **418-*p*. The signal I/F 413 (supply unit) supplies the temperature and the temperature of each of the display units 21-1-3 to 21-1-*n* supplied from the SIGNAL OUT terminal 412 to the SIGNAL IN terminal 411**.

Pieces of processing by the image acquisition unit 414, the current value acquisition unit 415, the adjustment unit 416, and the temperature correction unit 417 are similar to pieces of processing by the image acquisition unit 312, the current value acquisition unit 313, the adjustment unit 314, and the temperature correction unit 315 in FIG. 8, respectively, and thus, the description thereof is omitted.

Similarly to the LED module 316, the LED modules 418-1 to **418-*p* each include an LED driver 421, an LED array 422, and a temperature sensor 423. Pieces of processing by the LED driver 421, the LED array 422, and the temperature sensor 423 of the LED modules 418-1 to 418-*p* are similar to pieces of processing by the LED driver 321, the LED array 322, and the temperature sensor 323 in FIG. 8, respectively, and thus, the description thereof is omitted. Note that the LED arrays 422 of the LED modules 418-1 to 418-*p* are the LED arrays 41-1 to 41-*p* constituting the display unit 21-1-2. Hereinafter, in a case where it is not necessary to individually distinguish the LED modules 418-1 to 418-*p* from each other, they are simply referred to as LED modules 418**.

Note that the temperature sensor 423 may be provided outside the LED module 418 in the display unit 21-1-2. In a case where the temperature sensor 423 is provided outside the LED module 418, one temperature sensor 423 may be provided for the display unit 21-1-2 to measure the temperature of the entire display unit 21-1-2. The number of the LED drivers 421 and the LED arrays 422 included in the LED module 418 may be plural.

The display units 21-1-3 to **21-1-(*n*–1) and 21-*i*-3 to 21-*i*-(n–1) at other than the front-most stage and the rear-most stage are configured similarly to the display unit 21-1-2 described with reference to FIG. 9**, and thus, the description thereof is omitted.

The display units **21-1-*n* and 21-*i*–*n* at the rearmost stage are different from the display unit 21-1-2 described with reference to FIG. 9 in that nothing is connected to the SIGNAL OUT terminal 412, and other than that, the display units 21-1-*n* and 21-*i*–*n* are configured similarly to the display unit 21-1-2, and thus detailed description is omitted. The signal I/Fs 413 of the display units 21-1-*n* and 21-*i*–*n* at the rearmost stage directly supply the temperature supplied from the temperature sensor 423 to the SIGNAL IN terminal 411, and do not supply the area image and the display current value supplied from the SIGNAL IN terminal 411 to the SIGNAL OUT terminal 412**.

<Example of Heat Map of Video Wall>

Figure 10:
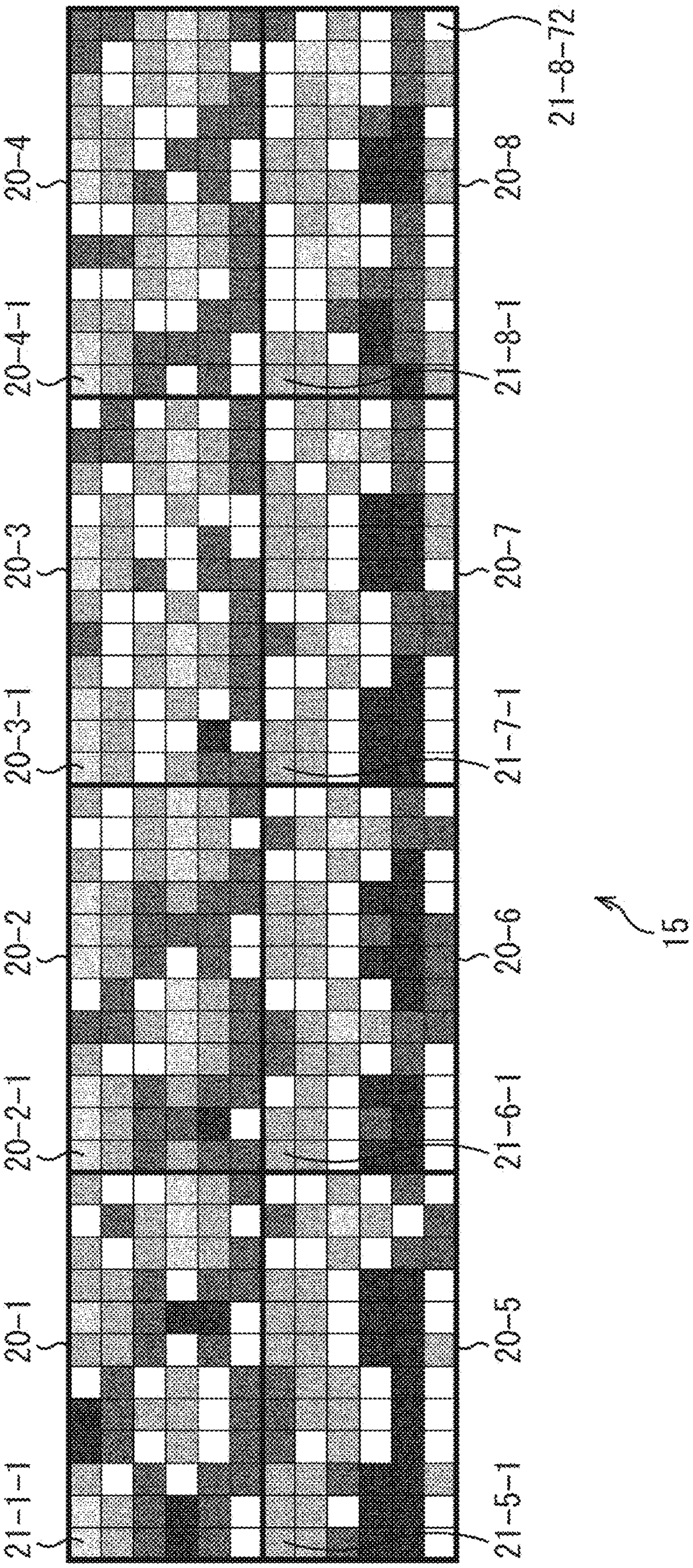
FIG. 10 is a diagram illustrating an example of a heat map of a video wall.

FIG. 10 is a diagram illustrating an example of a heat map of the video wall 15.

In FIG. 10, the height of the temperature of each display unit 21 is represented by density, and the higher the density, the higher the temperature. In the example in FIG. 10, the number p of the LED modules 316 (418) in each display unit 21 is 1, and the maximum temperature difference of the LED modules 316 (418) in the video wall 15 is 14° C.

As illustrated in FIG. 10, in the video wall 15, the temperature varies for each LED module 316 (418), and the luminance of each LED constituting the LED array 41 varies depending on the temperature. For example, the luminance of a red LED varies at 1%/° C. Thus, the temperature correction unit 315 (417) performs luminance chromaticity correction on the divided area image to be displayed on the basis of the temperature of the LED module 316 (418), and reduces the display luminance variation due to the temperature. As a result, the image quality of the image displayed on the entire video wall 15 can be improved.

As described above, the display unit 21 performs luminance chromaticity correction on the divided area image to be displayed on the basis of the temperature of the LED module 316 (418). Thus, the pixel value to be displayed transmitted from the master controller 13 or the slave controller 14 is different from the pixel value actually used for display in the display unit 21. Thus, the master controller 13 and the slave controller 14 acquire the temperature from the display unit 21, and correct the target average value on the basis of the temperature. As a result, it is possible to reduce an error between the overall average value used to calculate the display current value and the average value of the luminance of the entire image to be displayed calculated from the pixel value used for actual display. As a result, the video wall 15 can display the image to be displayed with more suitable display luminance.

<Example of Display Image>

Figure 11:
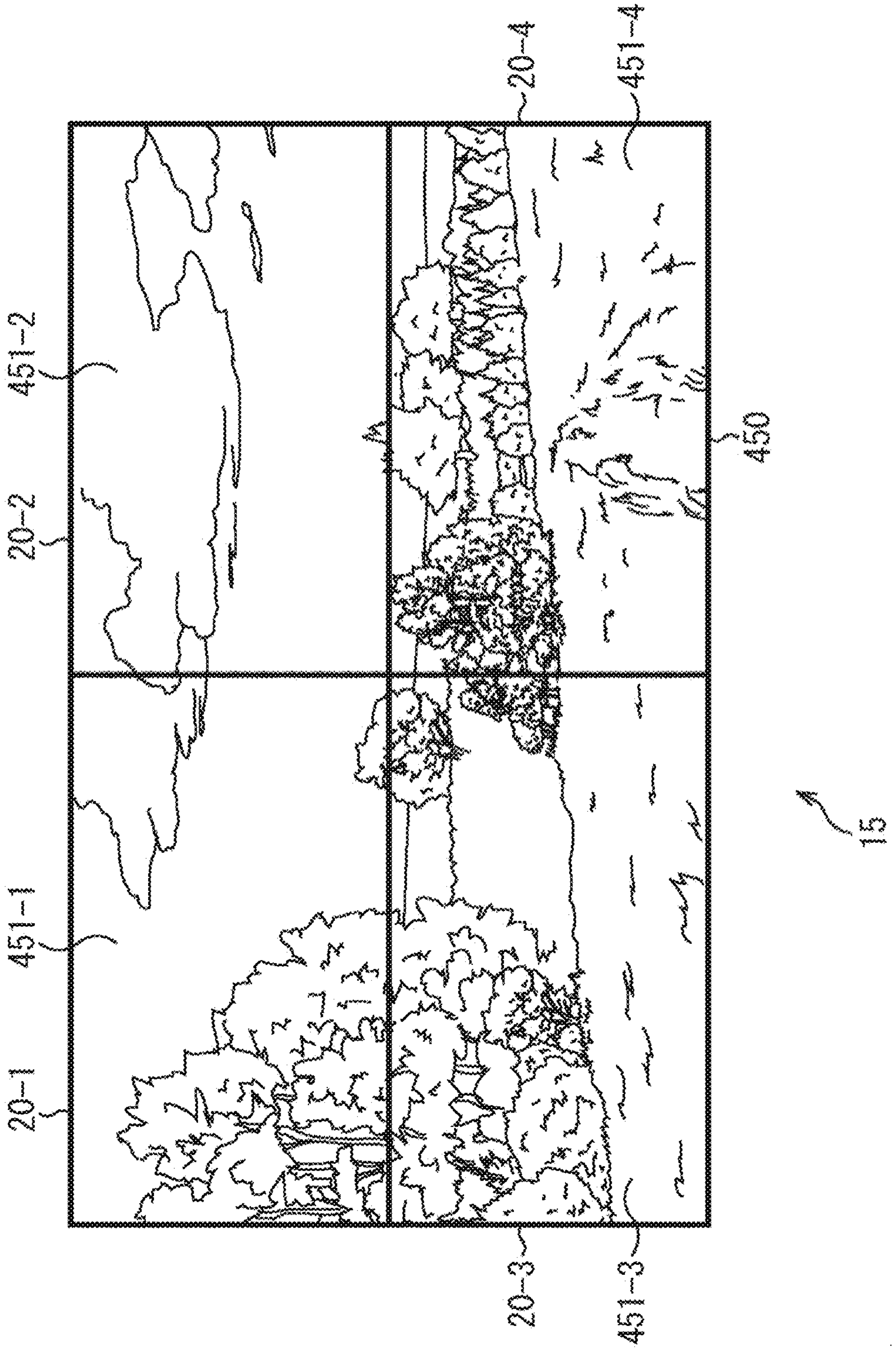
FIG. 11 is a diagram illustrating an example of an image displayed on a video wall.

FIG. 11 is a diagram illustrating an example of the image displayed on the video wall 15.

In the example in FIG. 11, the video wall 15 includes 2 (rows)×2 (columns) display unit groups 20-1 to 20-4.

As illustrated in FIG. 11, in a case where an 8k4k image 450 of one frame is displayed on the entire video wall 15, 4k2k images 451-1 to 451-4 are displayed as area images to be displayed on the display unit groups 20-1 to 20-4, respectively. Specifically, the 8k4k image 450 is divided into four areas, and the 4k2k image 451-1 in the upper left area of the four areas is displayed on the display unit group 20-1. The 4k2k image 451-2 in the upper right area is displayed on the display unit group 20-2, the 4k2k image 451-3 in the lower left area is displayed on the display unit group 20-3, and the 4k2k image 451-4 in the lower right area is displayed on the display unit group 20-4.

The display luminance of the 4k2k images 451-1 to 451-4 corresponds to the display current value calculated on the basis of the overall average value of the 8k4k image 450. Thus, the contrast of the 8k4k image 450 is improved without an increase in the total power consumption due to display of the video wall 15.

<Processing in Display System>

Figure 12:
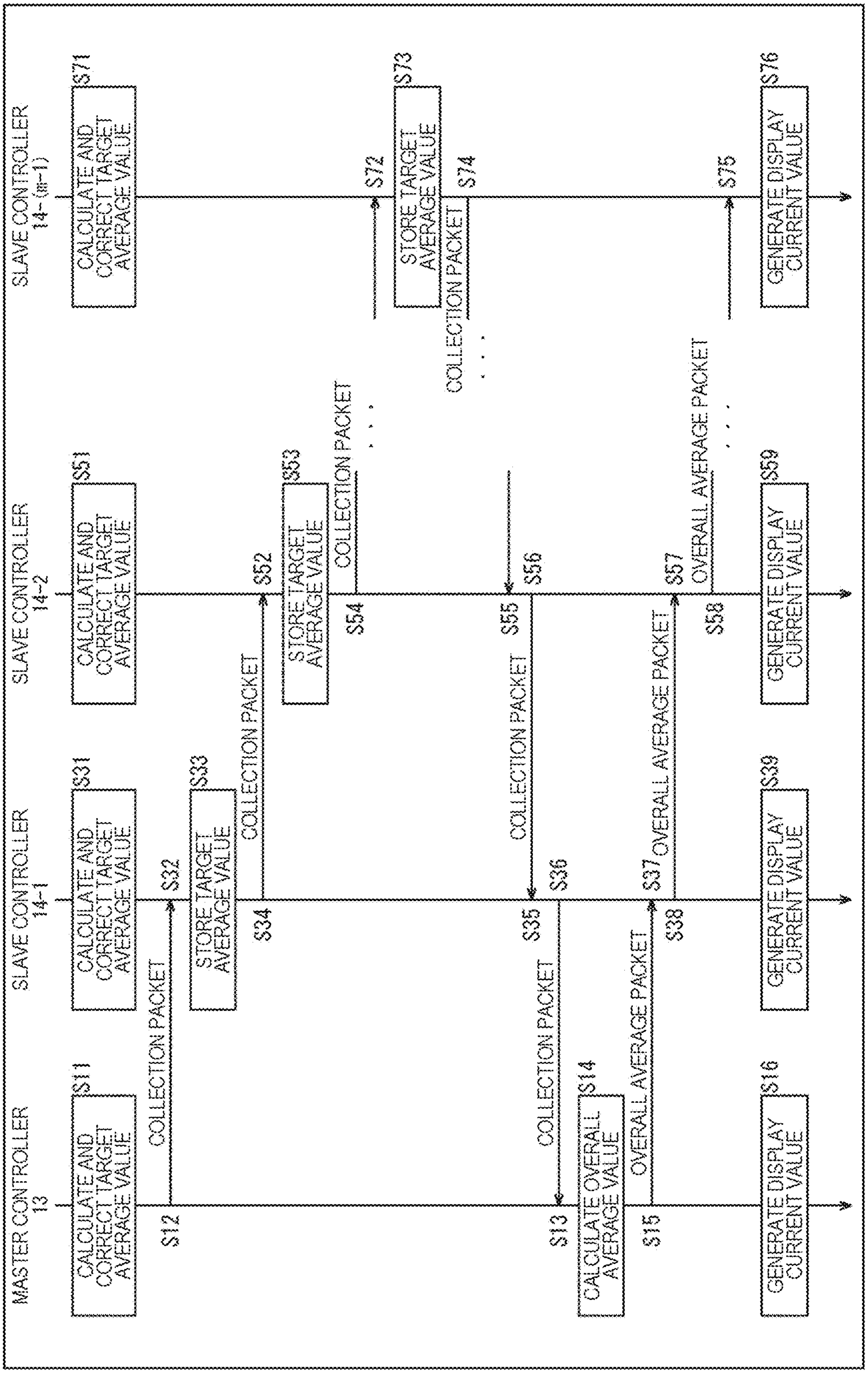
FIG. 12 is a flowchart illustrating processing in the display system.

FIG. 12 is a flowchart illustrating processing of generating a display current value in the display system 10. The processing is performed, for example, in units of frames.

In step S11 in FIG. 12, the target average value calculation unit 83 of the master controller 13 calculates a target average value on the basis of a display control target supplied from the correction unit 81, and corrects the target average value on the basis of a temperature supplied from the acquisition unit 82. The target average value calculation unit 83 supplies the corrected target average value to the overall average value calculation unit 84.

In step S31, the target average value calculation unit 183 of the slave controller 14-1 calculates a target average value on the basis of a display control target supplied from the correction unit 181, and corrects the target average value on the basis of a temperature supplied from the acquisition unit 182. The target average value calculation unit 183 supplies the corrected target average value to the data communication unit 191.

In step S51, the target average value calculation unit 183 of the slave controller 14-2 calculates a target average value on the basis of a display control target and corrects the target average value on the basis of a temperature, similarly to the slave controller 14-1. The target average value calculation unit 183 supplies the corrected target average value to the data communication unit 191. Although not illustrated, also in the slave controllers 14-3 to 14-($m$−2), a target average value is similarly calculated on the basis of a display control target, and the target average value is corrected on the basis of a temperature.

In step S71, the target average value calculation unit 183 of the slave controller 14-($m$−1) at the rearmost stage calculates a target average value on the basis of a display control target and corrects the target average value on the basis of a temperature, similarly to the slave controller 14-1. The target average value calculation unit 183 supplies the corrected target average value to the data communication unit 191.

In step S12, the collection packet transmission unit 111 generates a collection packet in which a non-target average value is not stored, and transmits the collection packet to the slave controller 14-1 via the LINK OUT terminal 63.

In step S32, the collection packet reception unit 211 of the slave controller 14-1 acquires the collection packet transmitted in step S12 via the LINK IN terminal 162. In step S33, the collection packet reception unit 211 stores (superimposes) the target average value corrected in step S31 as a non-target average value in the collection packet acquired in step S32. The collection packet reception unit 211 supplies the collection packet in which the non-target average value is stored to the transmission unit 212. In step S34, the transmission unit 212 transmits the collection packet in which the non-target average value is stored in step S33 to the slave controller 14-2 at the subsequent stage via the LINK OUT terminal 163.

In step S52, the collection packet reception unit 211 of the slave controller 14-2 acquires the collection packet transmitted in step S34 via the LINK IN terminal 162. In step S53, the collection packet reception unit 211 stores the target average value corrected in step S51 as a non-target average value in the collection packet acquired in step S52. The collection packet reception unit 211 supplies the collection packet in which the non-target average value is stored to the transmission unit 212. In step S54, the transmission unit 212 transmits the collection packet in which the non-target average value is stored to the slave controller 14-3 at the subsequent stage via the LINK OUT terminal 163.

Note that, although not illustrated, also in the slave controllers 14-3 to 14-($m$−2), the collection packet is similarly acquired from the slave controller 14 at the preceding stage. Then, the non-target average value is stored in the collection packet and transmitted to the slave controller 14 at the subsequent stage.

In step S72, the collection packet reception unit 211 of the slave controller 14-($m$−1) at the rearmost stage acquires the collection packet transmitted from the slave controller 14-($m$−2) via the LINK IN terminal 162. In step S73, the collection packet reception unit 211 stores the target average value corrected in step S71 as a non-target average value in the collection packet acquired in step S72. As a result, the collection packet is generated in which the non-target average values are stored by all the slave controllers 14. The collection packet reception unit 211 supplies the collection packet to the return unit 213. In step S74, the return unit 213 returns the collection packet in which the non-target average value is stored in step S73 to the slave controller 14-($m$−2) at the preceding stage via the LINK IN terminal 162.

Thereafter, although not illustrated, the slave controllers 14-3 to 14-($m$−1) each sequentially return the collection packet returned from the slave controller 14 at the subsequent stage to the slave controller 14 at the preceding stage.

In step S55, the collection packet reception unit 211 of the slave controller 14-2 acquires the collection packet from the slave controller 14-3 at the subsequent stage via the LINK OUT terminal 163. The collection packet reception unit 211 supplies the collection packet to the return unit 213. In step S56, the return unit 213 returns the collection packet acquired in step S55 to the slave controller 14-1 at the preceding stage via the LINK IN terminal 162.

In step S35, the collection packet reception unit 211 of the slave controller 14-1 acquires the collection packet returned from the slave controller 14-2 at the subsequent stage in step S56 via the LINK OUT terminal 163. The collection packet reception unit 211 supplies the collection packet to the return unit 213. In step S36, the return unit 213 returns the collection packet acquired in step S35 to the master controller 13 at the preceding stage via the LINK IN terminal 162.

In step S13, the reception unit 112 acquires the collection packet returned from the slave controller 14-1 at the subsequent stage in step S36 via the LINK OUT terminal 63. The reception unit 112 extracts the non-target average values of respective areas from the collection packet, and supplies the non-target average values to the overall average value calculation unit 84. In step S14, the overall average value calculation unit 84 calculates an overall average value on the basis of the corrected target average value calculated in step S11 and the non-target average values of respective areas acquired in step S13. The overall average value calculation unit 84 supplies the overall average value to the signal I/F 68 and the generation unit 85. In step S15, the overall average packet transmission unit 113 generates an overall average packet storing the overall average value calculated in step S14, and transmits the overall average packet to the slave controller 14-1 at the subsequent stage via the LINK OUT terminal 63.

In step S37, the overall average packet reception unit 214 of the slave controller 14-1 acquires the overall average packet transmitted from the master controller 13 at the preceding stage in step S15 via the LINK IN terminal 162. The overall average packet reception unit 214 supplies the overall average packet to the overall average value reception unit 184 and the transmission unit 212. In step S38, the transmission unit 212 transmits the overall average packet acquired in step S37 to the slave controller 14-2 at the subsequent stage via the LINK OUT terminal 163.

In step S57, the overall average packet reception unit 214 of the slave controller 14-2 acquires the overall average packet transmitted from the slave controller 14-1 at the preceding stage in step S38 via the LINK IN terminal 162. The overall average packet reception unit 214 supplies the overall average packet to the overall average value reception unit 184 and the transmission unit 212. In step S58, the data communication unit 191 transmits the overall average packet acquired in step S57 to the slave controller 14-3 at the subsequent stage via the LINK OUT terminal 163.

Note that, although not illustrated, also in the slave controllers 14-3 to 14-($m$−2), the overall average packet is similarly acquired from the slave controller 14 at the preceding stage, and the overall average packet is transmitted to the slave controller 14 at the subsequent stage.

In step S75, the overall average packet reception unit 214 of the slave controller 14-($m$−1) acquires the overall average packet transmitted from the preceding slave controller 14-($m$−2) via the LINK IN terminal 162. The overall average packet reception unit 214 supplies the overall average packet to the overall average value reception unit 184.

In step S16, the generation unit 85 generates (calculates) a display current value on the basis of the overall average value calculated in step S14. The display current value is supplied to the display unit 21-1-1 via the network I/F 69 and the LAN terminal 70. As a result, a current of the display current value is supplied to LEDs of the display unit group 20-1 including the display unit 21-1-1, and the LEDs emit light due to the current.

In step S39, the generation unit 185 of the slave controller 14-1 generates a display current value on the basis of the overall average value acquired in step S37. The display current value is supplied to the display unit 21-2-1 via the network I/F 169 and the LAN terminal 170. As a result, a current of the display current value is supplied to LEDs of the display unit group 20-2 including the display unit 21-2-1, and the LEDs emit light due to the current.

In step S59, the generation unit 185 of the slave controller 14-2 generates a display current value on the basis of the overall average value acquired in step S57. The display current value is supplied to the display unit 21-3-1 via the network I/F 169 and the LAN terminal 170. As a result, a current of the display current value is supplied to LEDs of the display unit group 20-3 including the display unit 21-3-1, and the LEDs emit light due to the current.

Note that, although not illustrated, also in the slave controllers 14-3 to 14-($m$−2), a display current value is similarly calculated on the basis of the overall average value. The display current values are supplied to the display units 21-4-1 to 21-($m$−1)−1 via the network I/F 169 and the LAN terminal 170, respectively. As a result, currents of the display current values are supplied to LEDs of the display unit groups 20-4 to 20-($m$−1), and the LEDs emit light due to the currents.

In step S76, the generation unit 185 of the slave controller 14-($m$−1) generates a display current value on the basis of the overall average value acquired in step S75. The display current value is supplied to the display unit 21-$m$−1 via the network I/F 169 and the LAN terminal 170. As a result, a current of the display current value is supplied to LEDs of the display unit group 20-$m$ including the display unit 21-$m$−1, and the LEDs emit light due to the current.

Note that the display current values generated by the master controller 13 and all the slave controllers 14 are the same.

As described above, the master controller 13 calculates a target average value, acquires a non-target average value from the slave controller 14, calculates an overall average value on the basis of the target average value and the non-target average value, and transmits the overall average value to the slave controller 14. Thus, the master controller 13 and the slave controller 14 can calculate display current values on the basis of the overall average value.

That is, in the display system 10 in which an image to be displayed is divided into a plurality of areas and each of the master controller 13 and the slave controller 14 controls the display of the image in each area, an ABL function can be implemented in the entire video wall 15. As a result, the contrast of the display image of the video wall 15 can be improved and the image quality of the display image can be improved without an increase in the total power consumption due to display.

In the present embodiment, the overall average value and the display current value are calculated in units of frames, but may be calculated in units of a plurality of frames. The display luminance may be controlled not by the display current value but by a pulse width when the video wall 15 displays the image to be displayed. In this case, the display control information can be, for example, a coefficient of the pulse width instead of the display current value. In a case where the display control information is the coefficient of the pulse width, the display unit 21 does not need to perform color correction such as white balance adjustment on the divided area image to be displayed. The display luminance may be controlled by both the display current value and the pulse width, and the display control information may include both the display current value and the coefficient of the pulse width.

The luminance information may be the display current value or the coefficient of the pulse width corresponding to the overall average value instead of the overall average value. In this case, the slave controller 14 does not include the generation unit 185, and supplies the received display current value or coefficient of the pulse width to the display unit 21-*i*-1 as it is.

<Configuration Example of Computer>

The above-described series of processing can be executed by hardware or software. In a case where the series of processing is executed by software, a program that configures the software is installed in a computer. Here, examples of the computer include a computer incorporated in dedicated hardware, and for example, a general-purpose personal computer that can execute various functions by installation of various programs.

Figure 13:
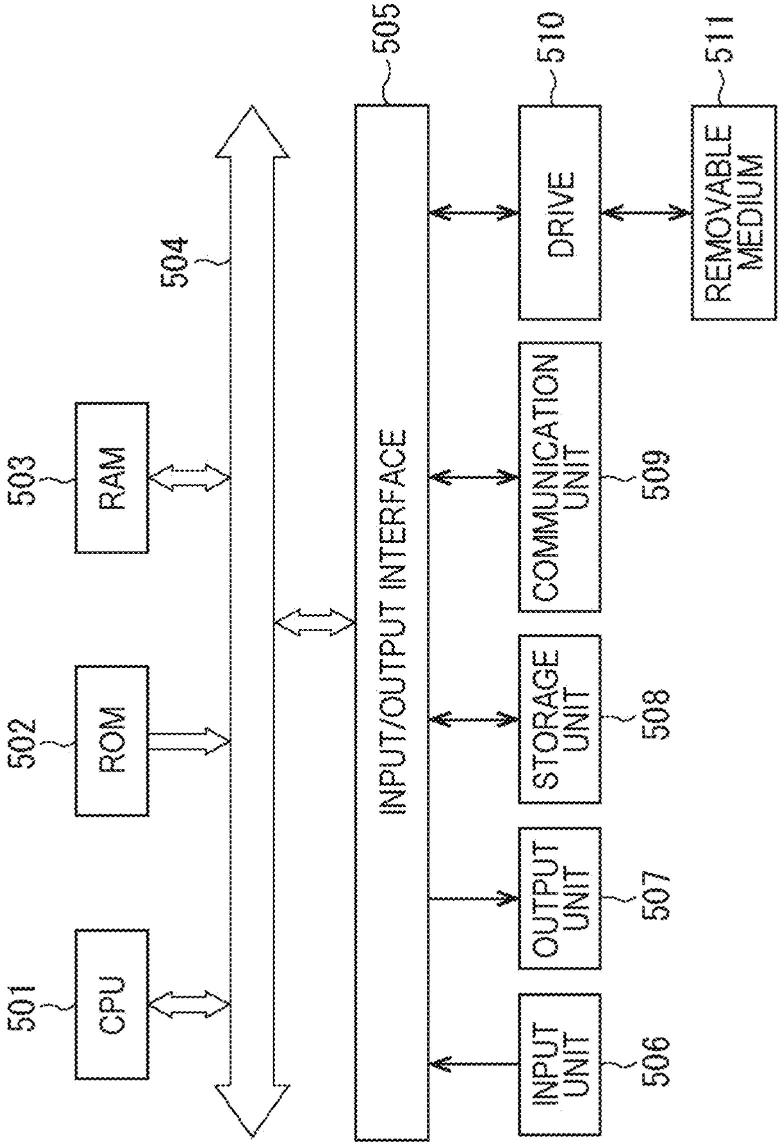
FIG. 13 is a block diagram illustrating a configuration example of hardware of a computer.

FIG. 13 is a block diagram illustrating a configuration example of hardware of the computer that executes the above-described series of processing by the program.

In the computer, a central processing unit (CPU) 501, a read only memory (ROM) 502, and a random access memory (RAM) 503 are mutually connected by a bus 504.

An input/output interface 505 is further connected to the bus 504. To the input/output interface 505, an input unit 506, an output unit 507, a storage unit 508, a communication unit 509, and a drive 510 are connected.

The input unit 506 includes a keyboard, a mouse, a microphone, and the like. The output unit 507 includes a display, a speaker, an LED driver, an LED array, and the like. The storage unit 508 includes a hard disk, a non-volatile memory and the like. The communication unit 509 includes a network interface and the like. The drive 510 drives a removable medium 511 such as a magnetic disk, an optical disk, a magnetooptical disk, or a semiconductor memory.

In the computer configured as described above, for example, the CPU 501 loads the program stored in the storage unit 508 into the RAM 503 via the input/output interface 505 and the bus 504 and executes the program, whereby the above-described series of processing is performed.

The program executed by the computer (CPU 501) can be provided by being recorded on, for example, a removable medium 511 as a package medium or the like. Furthermore, the program can be provided via a wired or wireless transmission medium such as a local area network, the Internet, or digital satellite broadcasting.

In the computer, the removable medium 511 is mounted to the drive 510, whereby the program can be installed in the storage unit 508 via the input/output interface 505. Furthermore, the program can be received by the communication unit 509 via the wired or wireless transmission medium to be installed on the storage unit 508. In addition, the program can be installed in the ROM 502 or the storage unit 508 in advance.

Note that the program executed by the computer may be a program that performs processing in a time series according to an order described in the present specification, or may be a program that performs processing in parallel or at necessary timing such as when a call is made.

In the present specification, a system means a set of a plurality of components (devices, modules (parts), and the like), and it does not matter whether or not all the components are in the same housing. Thus, a plurality of devices housed in separate housings and connected to each other via a network and a single device including a plurality of modules housed in a single housing are both systems.

An embodiment of the present technology is not limited to the embodiment described above, and various modifications can be made without departing from the scope of the present technology.

For example, it is possible to adopt a mode obtained by combining all or some of the plurality of embodiments described above.

For example, the present technology can have a configuration of cloud computing in which one function is shared and processed in cooperation by a plurality of devices via a network.

Furthermore, each step described in the flowchart described above can be performed by one device or can be shared and performed by a plurality of devices.

Moreover, in a case where a plurality of pieces of processing is included in one step, the plurality of pieces of processing included in the one step can be executed by one device or executed by a plurality of devices in a shared manner.

Note that, the effects described in the present specification are merely examples and are not limited, and there may be effects other than those described in the present specification.

The present technology can have the following configurations.

(1)

A display control device including:

a target average value calculation unit that sets, in a case where an image is divided into a plurality of areas and a plurality of display control devices controls display of the image in respective areas, the image in one of the plurality of areas as a display control target and calculates a target average value that is an average value of luminance of the display control target;

a reception unit that receives, from another display control device, a non-target average value that is an average value of luminance for each of the areas of an image other than the display control target in the image;

an overall average value calculation unit that calculates an overall average value that is an average value of luminance of a whole of the image on the basis of the target average value calculated by the target average value calculation unit and the non-target average value received by the reception unit; and a luminance information transmission unit that transmits, to the another display control device, luminance information regarding the luminance of the whole of the image, the luminance information corresponding to the overall average value calculated by the overall average value calculation unit.

(2)

The display control device according to (1), in which the plurality of display control devices is connected to each other in series.

(3)

The display control device according to (2), further including a packet transmission unit that transmits a packet in which the non-target average value for each of the areas is to be stored to the another display control device connected to the display control device, in which the reception unit receives the packet in which the non-target average value for each of the areas is stored from the another display control device connected to the display control device.

(4)

The display control device according to (2) or (3), in which the luminance information transmission unit transmits the luminance information to the another display control device connected to the display control device.

(5)

The display control device according to any of (1) to (4), further including a generation unit that generates display control information to be used for control of display luminance of the image on the basis of the overall average value, and supplies the display control information to a display section that displays the display control target.

(6)

The display control device according to (5), in which the display control information is a current value when the display section displays the display control target.

(7)

The display control device according to (5), in which the display section is subjected to pulse driving, and the display control information is a coefficient of a pulse width in the pulse driving when the display section displays the display control target.

(8)

The display control device according to any of (1) to (7), further including an acquisition unit that acquires a temperature of a display section that displays the display control target, in which the target average value calculation unit corrects the target average value on the basis of the temperature acquired by the acquisition unit, and the overall average value calculation unit calculates the overall average value on the basis of the target average value after correction and the non-target average value for each of the areas.

(9)

A display control device including:

a target average value calculation unit that sets, in a case where an image is divided into a plurality of areas and a plurality of display control devices controls display of the image in respective areas, the image in one of the plurality of areas as a display control target and calculates a target average value that is an average value of luminance of the display control target;

a transmission unit that transmits the target average value calculated by the target average value calculation unit to another display control device; and a luminance information reception unit that receives, from the another display control device, luminance information regarding luminance of a whole of the image, the luminance information corresponding to an overall average value that is an average value of the luminance of the whole of the image calculated with use of the target average value.

(10)

The display control device according to (9), in which the plurality of display control devices is connected to each other in series.

(11)

The display control device according to (10), further including a packet reception unit that receives a packet in which the target average value for each of the areas is to be stored from the another display control device at a preceding stage connected to the display control device, and stores the target average value calculated by the target average value calculation unit in the packet, in which the transmission unit transmits the packet in which the target average value is stored by the packet reception unit to the another display control device at the preceding stage.

(12)

The display control device according to (11), in which the transmission unit transmits the packet in which the target average value is stored to another display control device at a subsequent stage connected to the display control device, and transmits the packet returned from the another display control device at the subsequent stage to the another display control device at the preceding stage.

(13)

The display control device according to any of (10) to (12), in which the luminance information reception unit receives the luminance information from the another display control device connected to the display control device.

(14)

The display control device according to any of (9) to (13), further including a generation unit that generates display control information to be used for control of display luminance of the image on the basis of the overall average value, and supplies the display control information to a display section that displays the display control target.

(15)

The display control device according to (14), in which the display control information is a current value when the display section displays the display control target.

(16)

The display control device according to (14), in which the display section is subjected to pulse driving, and the display control information is a coefficient of a pulse width in the pulse driving when the display section displays the display control target.

(17)

The display control device according to any of (9) to (16), further including an acquisition unit that acquires a temperature of a display section that displays the display control target, in which the target average value calculation unit corrects the target average value on the basis of the temperature acquired by the acquisition unit, and the transmission unit transmits the target average value after correction.

(18)

A display device including:

an image acquisition unit that acquires, in a case where an image is divided into a plurality of areas and a plurality of display control devices controls display of the image in respective areas, the image in one of the areas as a display target, the areas being display control targets of the display control devices connected to the display device;

a supply unit that supplies a temperature of the display device to the display control devices connected to the display device;

a display control information acquisition unit that acquires display control information to be used for control of display luminance of the image, the display control information being calculated on the basis of the temperature by the display control devices connected to the display device; and a display section that displays the display target acquired by the image acquisition unit with display luminance corresponding to the display control information acquired by the display control information acquisition unit.

(19)

The display device according to (18), further including an adjustment unit that adjusts white balance of the display target acquired by the image acquisition unit on the basis of the display control information, in which the display control information is a current value when the display section displays the display target, and the display section displays the display target in which the white balance is adjusted by the adjustment unit on the basis of the current value.

(20)

The display device according to (18), in which the display section is subjected to pulse driving, and the display control information is a coefficient of a pulse width in the pulse driving when the display section displays the display target.

REFERENCE SIGNS LIST

13 Master controller
14-1 to 14-($m$−1) Slave controller
15 Video wall
20-1 to 20-$m$ Display unit group
21-1-1 to 21-$m$-$n$ Display unit
82 Acquisition unit
83 Target average value calculation unit
84 Overall average value calculation unit
85 Generation unit
111 Collection packet transmission unit
112 Reception unit
113 Overall average packet transmission unit
182 Acquisition unit
183 Target average value calculation unit
185 Generation unit
211 Collection packet reception unit
212 Transmission unit
213 Return unit
214 Overall average packet reception unit
311 Signal I/F
312 Image acquisition unit
313 Current value acquisition unit
314 Adjustment unit
322 LED array
413 Signal I/F
414 Image acquisition unit
415 Current value acquisition unit
416 Adjustment unit
422 LED array

The invention claimed is:

1. A display control device comprising:

a target average value calculation unit that sets, in a case where an image is divided into a plurality of areas and a plurality of display control devices controls display of the image in respective areas, the image in one of the plurality of areas as a display control target and calculates a target average value that is an average value of luminance of the display control target;

a reception unit that receives, from another display control device, a non-target average value that is an average value of luminance for each of the areas of an image other than the display control target in the image;

an overall average value calculation unit that calculates an overall average value that is an average value of luminance of a whole of the image on a basis of the target average value calculated by the target average value calculation unit and the non-target average value received by the reception unit; and a luminance information transmission unit that transmits, to the another display control device, luminance information regarding the luminance of the whole of the image, the luminance information corresponding to the overall average value calculated by the overall average value calculation unit, further comprising an acquisition unit that acquires a temperature of a display section that displays the display control target, wherein the target average value calculation unit corrects the target average value on a basis of the temperature acquired by the acquisition unit, and the overall average value calculation unit calculates the overall average value on a basis of the target average value after correction and the non-target average value for each of the areas.

2. The display control device according to claim 1, wherein the plurality of display control devices is connected to each other in series.

3. The display control device according to claim 2, further comprising a packet transmission unit that transmits a packet in which the non-target average value for each of the areas is to be stored to the another display control device connected to the display control device, wherein the reception unit receives the packet in which the non-target average value for each of the areas is stored from the another display control device connected to the display control device.

4. The display control device according to claim 2, wherein the luminance information transmission unit transmits the luminance information to the another display control device connected to the display control device.

5. The display control device according to claim 1, further comprising a generation unit that generates display control information to be used for control of display luminance of the image on a basis of the overall average value, and supplies the display control information to a display section that displays the display control target.

6. The display control device according to claim 5, wherein the display control information is a current value when the display section displays the display control target.

7. The display control device according to claim 5, wherein the display section is subjected to pulse driving, and the display control information is a coefficient of a pulse width in the pulse driving when the display section displays the display control target.

* * * * *